United States Patent
Bresloff et al.

(10) Patent No.: US 12,271,502 B2
(45) Date of Patent: Apr. 8, 2025

(54) DELEGATED SIGNING USING SENSITIVITY CLASSIFICATION

(71) Applicant: DocuSign, Inc., San Francisco, CA (US)

(72) Inventors: Michael Brian Bresloff, Seattle, WA (US); Janice Bae, San Francisco, CA (US); Yi Gao, Seattle, WA (US)

(73) Assignee: Docusign, Inc., San Francisco, CA (US)

( * ) Notice: Subject to any disclaimer, the term of this patent is extended or adjusted under 35 U.S.C. 154(b) by 452 days.

(21) Appl. No.: 17/488,175

(22) Filed: Sep. 28, 2021

(65) Prior Publication Data
US 2023/0095155 A1 Mar. 30, 2023

(51) Int. Cl.
*G06F 21/62* (2013.01)
*G06F 16/11* (2019.01)
(Continued)

(52) U.S. Cl.
CPC ........ *G06F 21/6245* (2013.01); *G06F 16/122* (2019.01); *G06F 16/93* (2019.01);
(Continued)

(58) Field of Classification Search
CPC .... G06F 21/6245; G06F 16/93; G06F 16/122; G06F 2221/2141; G06F 2221/2145; G06N 20/00
(Continued)

(56) References Cited

U.S. PATENT DOCUMENTS 7,823,189 B2 * 10/2010 Patrick ................ G06F 21/6245
709/219
10,783,192 B1 * 9/2020 Soubbotin ........... G06F 16/2428
(Continued)

FOREIGN PATENT DOCUMENTS

AU 2010100507 A4 * 6/2010 ......... G06F 21/6209
CN 110472234 A * 11/2019
(Continued)

OTHER PUBLICATIONS

Bahri, Leila, Barbara Carminati, and Elena Ferrari. "Privacy in web service transactions: A tale of more than a decade of work." IEEE Transactions on Services Computing 11, No. 2 (2017): 448-465. (Year: 2017).*
(Continued)

*Primary Examiner* — Luu T Pham
*Assistant Examiner* — Walter J Malinowski
(74) *Attorney, Agent, or Firm* — Shumaker & Sieffert, P.A.

(57) ABSTRACT

A centralized document system generates a document package in response to a request by an originating entity. The document package includes at least one document for execution by a first receiving entity. The first receiving entity can specify a set of permissions for a second receiving entity to perform actions to documents within the package on behalf of the first receiving entity. Accordingly, the system may provide the document package to both the first and second receiving entities for the first receiving entity to execute the at least one document. Before providing the document to the second receiving entity, system may determine whether there is a sensitive document in the package and whether to delegate the document to the second entity. Accordingly, the system may prevent a sensitive document package from being provided to the second receiving entity for execution.

16 Claims, 8 Drawing Sheets

(51) Int. Cl.
*G06F 16/93* (2019.01)
*G06N 20/00* (2019.01)

(52) U.S. Cl.
CPC ..... *G06N 20/00* (2019.01); *G06F 2221/2141* (2013.01); *G06F 2221/2145* (2013.01)

(58) Field of Classification Search
USPC .......................................................... 726/27
See application file for complete search history.

(56) References Cited

U.S. PATENT DOCUMENTS

| | | | | |
|---|---|---|---|---|
| 12,014,309 | B1* | 6/2024 | Li | G06Q 10/103 |
| 2002/0026592 | A1 | 2/2002 | Gavrila et al. | |
| 2004/0194027 | A1* | 9/2004 | Suzuki | G06F 40/117 |
| | | | | 380/278 |
| 2004/0243811 | A1* | 12/2004 | Frisch | H04L 9/3297 |
| | | | | 713/176 |
| 2005/0033813 | A1* | 2/2005 | Bhogal | G06Q 10/10 |
| | | | | 709/206 |
| 2006/0136467 | A1* | 6/2006 | Avinash | G06F 16/25 |
| | | | | 707/999.102 |
| 2007/0079128 | A1* | 4/2007 | Cheng | G06Q 10/00 |
| | | | | 713/176 |
| 2007/0101436 | A1 | 5/2007 | Redlich et al. | |
| 2008/0037052 | A1* | 2/2008 | Nishiguchi | G06F 16/93 |
| | | | | 358/1.14 |
| 2009/0094460 | A1* | 4/2009 | Dedek | H04L 9/3247 |
| | | | | 713/180 |
| 2009/0292786 | A1* | 11/2009 | McCabe | G06Q 10/10 |
| | | | | 709/224 |
| 2010/0010926 | A1* | 1/2010 | Eckert | G06Q 40/06 |
| | | | | 705/37 |
| 2011/0126111 | A1 | 5/2011 | Gill et al. | |
| 2011/0276875 | A1* | 11/2011 | McCabe | G06Q 10/10 |
| | | | | 715/255 |
| 2013/0019289 | A1* | 1/2013 | Gonser | H04L 63/08 |
| | | | | 726/6 |
| 2013/0325893 | A1* | 12/2013 | Asay | G06Q 10/083 |
| | | | | 707/769 |
| 2014/0122617 | A1* | 5/2014 | Ferguson | G06Q 10/107 |
| | | | | 709/206 |
| 2014/0196103 | A1* | 7/2014 | Chari | H04L 63/20 |
| | | | | 726/1 |
| 2014/0351133 | A1* | 11/2014 | Christian | G06Q 20/3276 |
| | | | | 705/44 |
| 2015/0150090 | A1* | 5/2015 | Carroll | G06F 21/64 |
| | | | | 726/3 |
| 2015/0213404 | A1* | 7/2015 | Follis | G06F 21/6209 |
| | | | | 705/317 |
| 2016/0226829 | A1* | 8/2016 | Steeves | H04L 63/061 |
| 2016/0256086 | A1* | 9/2016 | Byrd | A61B 5/14532 |
| 2017/0041296 | A1 | 2/2017 | Ford et al. | |
| 2017/0083867 | A1* | 3/2017 | Saxena | G06Q 10/103 |
| 2018/0239959 | A1* | 8/2018 | Bui | G06F 16/93 |
| 2019/0050587 | A1* | 2/2019 | Dang | G06F 21/6209 |
| 2019/0230177 | A1* | 7/2019 | Sosna | H04L 67/561 |
| 2019/0268379 | A1* | 8/2019 | Narayanaswamy | |
| | | | | H04L 63/0245 |
| 2019/0347429 | A1* | 11/2019 | Jean-Louis | G06N 5/022 |
| 2019/0378621 | A1* | 12/2019 | Ellison | G06F 3/011 |
| 2021/0120044 | A1* | 4/2021 | Balan | G06N 5/01 |
| 2021/0216763 | A1* | 7/2021 | Dang | G06N 20/00 |
| 2022/0050906 | A1* | 2/2022 | Mulligan | G06F 21/6209 |
| 2022/0245122 | A1 | 8/2022 | Ashlock et al. | |
| 2022/0245201 | A1 | 8/2022 | Ashlock et al. | |
| 2022/0245592 | A1 | 8/2022 | Ashlock et al. | |
| 2022/0365982 | A1* | 11/2022 | Ashlock | G06F 16/162 |
| 2023/0185861 | A1* | 6/2023 | Ashlock | H04L 51/08 |
| | | | | 707/705 |
| 2023/0325582 | A1* | 10/2023 | Shapiro | G06F 40/205 |
| | | | | 715/234 |

FOREIGN PATENT DOCUMENTS

| | | | | |
|---|---|---|---|---|
| EP | 2744145 A1 * | 6/2014 | | H04L 9/08 |
| JP | 2002123764 A * | 4/2002 | | |
| JP | 2004140636 A * | 5/2004 | | |
| KR | 20130000811 A * | 1/2013 | | |
| WO | WO-0057318 A1 * | 9/2000 | | G06F 1/00 |
| WO | WO-2010111868 A1 * | 10/2010 | | G06F 3/0482 |
| WO | WO-2017076210 A1 * | 5/2017 | | G06F 16/2365 |

OTHER PUBLICATIONS

Zhu, Yan, Yao Qin, Zhiyuan Zhou, Xiaoxu Song, Guowei Liu, and William Cheng-Chung Chu. "Digital asset management with distributed permission over blockchain and attribute-based access control." In 2018 IEEE international conference on services computing (SCC), pp. 193-200. IEEE, 2018. (Year: 2018).*

Karagodin, A. M. "Public key infrastructure-enabled services." In Proceedings. The 9th Russian-Korean International Symposium on Science and Technology, 2005. KORUS 2005., pp. 989-994. IEEE, 2005. (Year: 2005).*

International Search Report and Written Opinion of International Application No. PCT/US2022/043707 dated Jan. 13, 2023, 8 pp.

International Preliminary Report on Patentability from International Application No. PCT/US2022/043707 dated Apr. 11, 2024, 8 pp.

* cited by examiner

Envelope History

| Name | Sensitive | Substitute(s) Assigned | Signed By |
|---|---|---|---|
| Envelope 21 | No | Yes | Ysenia V. |
| Envelope 24 | Yes | Yes | Seonho K. |
| Envelope 25 | Yes | Yes | *Unsigned* |
| Envelope 1 | No | No | Terry H. |
| Envelope 2 | Yes | No | Terry H. |
| Envelope 3 | No | No | Terry H. |
| Envelope 4 | Yes | No | Terry H. |
| Envelope 5 | Yes | No | Terry H. |
| Envelope 6 | No | No | Terry H. |
| Envelope 7 | No | No | Terry H. |

Sort/Filter

Sort by: Select... / Envelope Name / Sensitive / Substitute Assigned / Signed By Filter: ☒ Substitute Assigned  ☐ Substitute Signed  ☐ Sensitive

[FINISH]  [OTHER ACTIONS ▶]

FIG. 5

DELEGATED SIGNING USING SENSITIVITY CLASSIFICATION

BACKGROUND

This disclosure relates generally to the execution of documents, and more specifically to modifications of a document package during the execution of documents in a document management platform.

After agreement is reached between two or more entities (such as companies, individuals, groups, or the like) regarding language, terms, or other contents of one or more documents, the entities may proceed to an execution phase for the one or more documents. During the execution phase, in current systems, one entity (e.g., an originating entity) generates a document package that includes the one or more documents and sends the document package to a second entity (e.g., a receiving entity). Sometimes, the originating entity may assign certain permissions and/or certain tasks associated with the document package to the receiving entity. However, certain policies (e.g., signing requirements) of an organization of the receiving entity may require one or more changes in permissions, contents, or actions associated with the document package before the document package can be executed. A policy of the receiving entity's organization can permit another receiving entity to sign on a receiving entity's behalf. However, this delegation of documents can be difficult to manage or be beyond the control of the originating entity's organization, which wants to prevent sensitive documents from being accessed by delegates who do not have appropriate authority. Furthermore, delegating documents requires additional network bandwidth and storage space to accommodate for the additional receiving entities who are receiving copies of document packages to execute on behalf of an intended recipient.

SUMMARY

The management of distribution of a document package for the execution of one or more documents within a document management platform is described herein. To facilitate the execution of the one or more documents between multiple entities (e.g., between an originating entity and a receiving entity), a centralized document system, in some embodiments, may provide a means for the receiving entity to delegate permissions to another receiving entity (e.g., a second receiving entity). The permissions define one or more actions that an entity can perform in association with the one or more documents, which may contain sensitive content such as a classified agreement, personal information (e.g., a residential address), or other sensitive information (e.g., an employee's annual compensation amount). Further, the second receiving entity can lack authorization according to the originating entity's policies to view the sensitive material despite having authorization according to the first receiving entity's organization. To facilitate execution of a document without exposing sensitive material to the second receiving entity, the centralized document system determines if the document contains sensitive content and whether the originating entity's policies would permit the delegation of a sensitive document to the second receiving entity. Thus, the centralized document system can distribute sensitive documents if appropriate.

By preventing a sensitive document from being distributed, the centralized document system not only secures the sensitive information but also saves network bandwidth and storage space that would otherwise have been consumed by sending the sensitive document to substitute recipient entities. Furthermore, the centralized document system increases the processing efficiency of a machine-learned system for preventing sensitive documents from being undesirably distributed. Rather than scan each document for sensitive information, which would consume significant processing resources (e.g., especially for large documents or document envelopes), the centralized document system applies a machine-learned model upon certain conditions being met. For example, by first determining that documents sent to the receiving entity will also be provided to a substitute receiving entity because the receiving entity has set up an automated out-of-office reply to emails, the centralized document system can determine to prevent the document from being provided to the substitute receiving entity and skip applying the machine-learned model.

While document attributes can be used to determine whether a document is sensitive, the centralized document system can additionally consider entity attributes to increase the accuracy at which a model can determine the likelihood that a document is sensitive. Document attributes describe a document's characteristics. Examples of document attributes include the content of the document (e.g., texts or images), an author of a document, or a time at which the document was created. Entity attributes describe one or more entities involved in the distribution of a document envelope (e.g., an originating entity, receiving entity, or substitute receiving entity) and can include a name, title of authority, organization to which the entity belongs or with which is affiliated, previously received envelopes, or previously executed documents. By applying a model (e.g., machine-learned model) that is created using both document and entity attributes, the model can determine how a document containing sensitive information (e.g., as indicated by document attributes) is sensitive relative to the recipient of the document. For example, medical information may be sensitive information that one type of substitute entity (e.g., a supervisor) should not see but is okay for a different type of substitute entity (e.g., the assistant) to see. In this example, the centralized document system may determine to provide the document when the document attributes indicate medical information and the entity attributes indicate the substitute receiving entity is an assistant, but prevent the document from being provided when the entity attributes indicate the substitute receiving entity is a supervisor.

In one embodiment, the centralized document system generates a document package in response to a request from an originating entity. Respective sets of document permissions may be assigned to a first receiving entity and a second receiving entity, where the permissions define respective actions that are executable by the first and second receiving entities with a document in the document package. The centralized document system can determine a sensitivity level of the document using a model and attributes of the document. Using the determined sensitivity level, the centralized document system may determine whether to delegate the document to the second receiving entity. If the centralized document system determines not to delegate the document, the centralized document system may prevent the document package from being provided to the second receiving entity for execution.

The centralized document system may compare the sensitivity level to a policy of the originating entity's organization to determine whether to delegate the document to the second receiving entity. The policy may include instructions to delegate the document when the document has a certain sensitivity level and include instructions not to delegate when the document has a different sensitivity level. To determine not to delegate the document to the second receiving entity, the centralized document system may determine that a first policy of the originating entity's organization specifies that documents having a particular sensitivity level are not to be delegated to a second receiving entity and override a second policy of the first receiving entity's organization that specifies that the second receiving entity is authorized to receive the document package.

In some embodiments, the centralized document system determines the sensitivity level in response to determining that a policy of the first receiving entity's organization specifies that the second receiving entity is authorized to receive the document package. For example, the policy can specify that the second receiving entity can receive the document package when the first receiving entity has set up automatic out-of-office responses to received emails or when metadata of the document package indicates an "urgent" flag or another indication of time sensitivity is associated with the document. If the system determines to delegate the document to the second receiving entity, the system can provide the document package to both the first and second receiving entities for execution by one or the other.

If the centralized document system determines to delegate the document to the second receiving entity, the system may cause the second receiving entity's user device to render a graphical user interface (GUI) that includes a notification informing the second receiving entity of a permission within their document permissions that authorizes the second receiving entity to execute the document on behalf of the first receiving entity. In some embodiments, the model used to determine the sensitivity level is a machine-learned model trained using labeled representations of historical documents characterized by respective document attributes. The labels used to label the historical documents may indicate respective sensitivity levels. To determine the sensitivity level, the centralized document system may generate a document feature representation using the document attributes of the document and apply the machine-learned model to the document feature representation.

The machine-learned model used to determine the sensitivity level of the document may be trained by generating document feature representations for each document of the historical documents, where the document feature representations include numerical representations of the respective document attributes of each document. The document feature representations can be labeled and the labeled representations can be used to create a first set of training data. The centralized document system then trains the machine-learned model using the first set of training data. The machine-learned model can be further trained by receiving user feedback indicating a measure of approval of the sensitivity level of the document, creating a second set of training data based on the user feedback, and re-training the machine-learned model using the second set of training data.

In some embodiments, the model is a rules-based model that is configured according to rules that specify the document has one of various sensitivity levels based on the document attributes of the document. A first sensitivity level may indicate that the document is not sensitive. A rule of the rule-based model can specify that the document has a second sensitivity level if the author of the document has a job title associated with high sensitivity documents (e.g., a director of human resources). The centralized document system may cause the first receiving entity's user device to render a GUI with identifiers of document packages received for execution by the first receiving entity in addition to user inputs for filtering a subset of the received document packages that were provided to the second receiving entity (e.g., for execution on behalf of the first receiving entity) in addition to the first receiving entity.

The first receiving entity may specify or request a permission of the second receiving entity to limit the actions that can be performed by the second receiving entity from a start date to an end date. For example, the first receiving entity specifies that the second receiving entity can sign on their behalf only during the month of February. The centralized document system can cause the first receiving entity's client device to render a GUI having user inputs for specifying the start and end dates.

The centralized document system may determine the sensitivity level using entity attributes (e.g., of the second receiving entity) in addition to document attributes. Entity attributes may include at least one of a title in an organization, an Internet Protocol (IP) address, historical document packages executed by the second receiving entity, the name of the organization, an org chart of the organization, or a policy of the organization. Document attributes can include at least one of an author of the document, a document type, content of the document, or a date at which the document was generated, where the content can include a text or an image. The document type can include at least one of a confidentiality agreement, a rental agreement, or an employee agreement.

BRIEF DESCRIPTION OF THE DRAWINGS

FIG. 5 illustrates an example user interface for viewing a history of created document packages, according to one embodiment.

Figure 1:
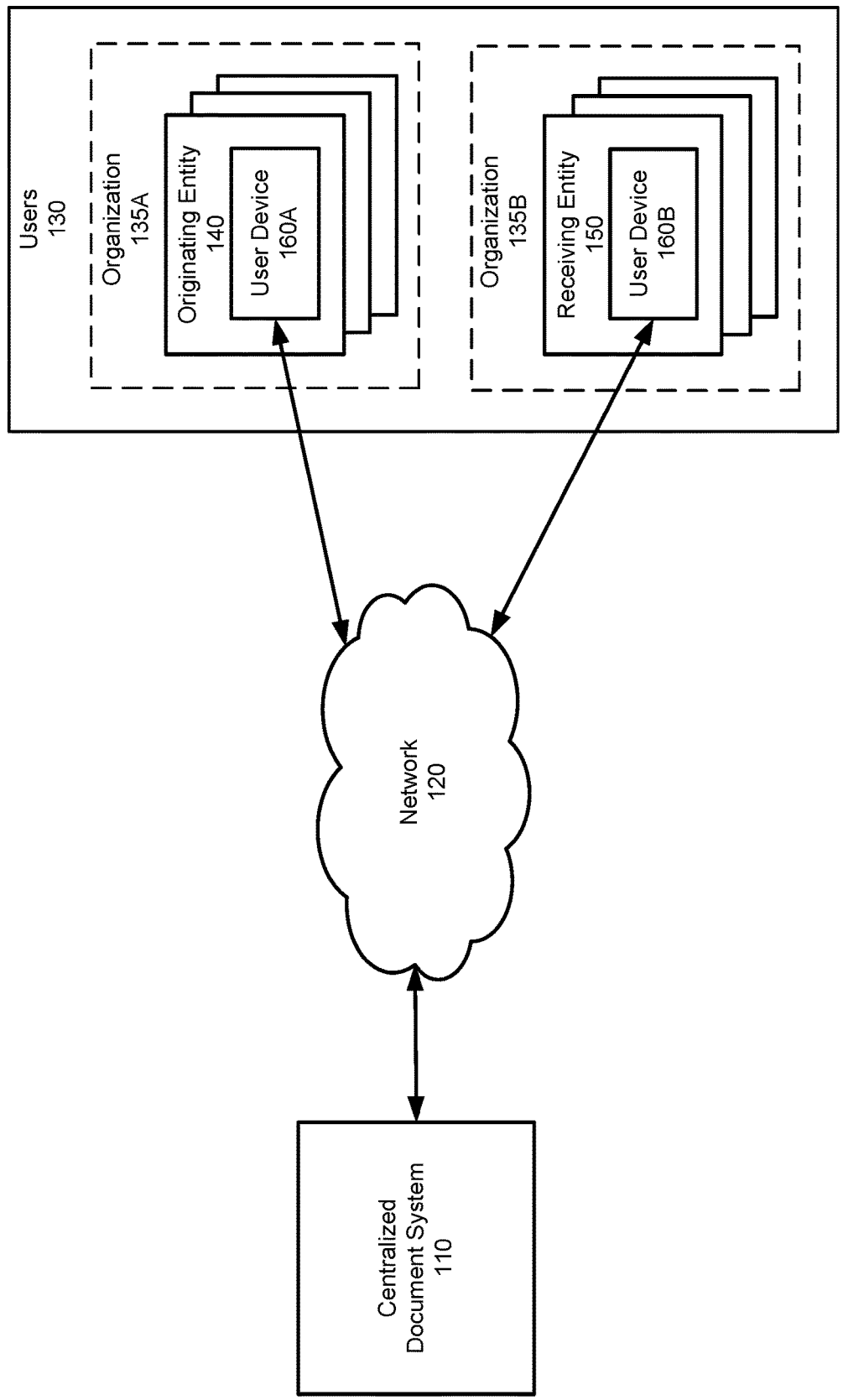
FIG. 1 is a block diagram of a system environment in which a centralized document system operates, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment Overview

A system environment enables an originating entity of a first organization to create and send documents to one or more receiving entities of a second organization for negotiation, collaborative editing, electronic execution (e.g., electronic signature), automation of contract fulfilment, archival, and analysis, among other tasks. Within the system environment, a receiving entity may review content and/or terms presented in a digital document, and in response to agreeing to the content and/or terms, can electronically execute the document. In some embodiments, in advance of the execution of the documents, the originating entity may generate a document package to provide to the one or more receiving entities. The document package includes at least one document to be executed by one or more receiving entities. In some embodiments, the document package may also include one or more permissions defining actions the one or more receiving entities can perform in association with the document package. In some embodiments, the document package may also identify tasks the one or more receiving entities are to perform in association with the document package.

The system environment described herein can be implemented within a centralized document system, an online document system, a document management system, or any type of digital management platform. It should be noted that although description may be limited in certain contexts to a particular environment, this is for the purposes of simplicity only, and in practice the principles described herein can apply more broadly to the context of any digital management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform. It should also be noted that "centralized document system," "document management system," and other similar terminology are used interchangeably herein.

The processes described herein, in some implementations, provide a means for the one or more receiving entities to assign a set of permissions to additional receiving entities. The centralized document system automatically assigns the set of permissions to the additional receiving entities if the set of permissions are included in the one or more permissions originally assigned to receiving entities within the document package by the originating entity. The centralized document system requests that the originating entity confirm that the additional receiving entities can be assigned the set of permissions before assigning if the set of permissions are not included in the one or more permissions originally assigned to the receiving entities by the originating entity.

The processes described herein, in alternative implementations, provide a means for the document package to be modified prior to the document package being provided to the one or more receiving entities. The centralized document system scans the document package to determine whether the document package includes at least one document of a particular document type (e.g., purchase agreement, sales contract, etc.) specified in a policy of a second organization (the organization associated with the one or more receiving entities). The policy may specify for particular document types certain acting entities within the second organization and certain tasks the acting entities are to perform in relation to the document package before the documents can be executed. If the document package contains at least one document of a particular document type specified by the policy, the centralized document system automatically modifies the document package to identify the certain acting entities and the tasks the acting entities are to perform corresponding to the document type without requesting permission from the originating entity. The document package is then provided to the second organization for execution. It should also be noted that "acting entity," "receiving entity," and other similar terminology are used interchangeably herein.

The processes described herein, in additional implementations, provide a means for the document package to be modified to be sent an additional receiving entity if a receiving entity is unavailable. The centralized document system receives an indication that a receiving entity is unavailable and a substitute receiving entity is identified based on one or more rules of the second organization. The document package is modified and provided to the substitute entity for execution. Additional functionalities of example centralized document systems may be found in U.S. patent application Ser. Nos. 17/162,722, 17/162,744, and 17/162,765 filed Jan. 29, 2021, which are incorporated herein by reference.

FIG. 1 is a block diagram of a system environment in which a centralized document system operates, according to one embodiment. The system environment 100 shown by FIG. 1 comprises a centralized document system 110, a network 120, a plurality of users 130 which includes a subset of originating entities 140 associated with a first organization 135A and a subset of receiving entities 150 associated with a second organization 135B, each associated with a user device 160 (e.g., originating entity 140 is associated with user device 160A and receiving entity 150 is associated with user device 160B). In alternative configurations, different and/or additional components may be included in the system environment 100.

The centralized document system 110 is a computer system (or group of computer systems) for storing and managing documents and/or document packages (e.g., envelopes) for a plurality of users 130. Using the centralized document system 110, users 130 can collaborate to create, edit, review, negotiate, and execute documents. During execution of one or more documents, the centralized document system 110 provides a means for generating and modifying a document package (also referred to as a document envelope). The document package may include at least one document for execution. The centralized document system 110 may provide the at least one document (e.g., a contract, agreement, purchase order, or other suitable document) in which terms have been agreed upon by two or more organizations (e.g., by two or more users 130, such as organization 135A and organization 135B) to a receiving entity 150 of organization 135B for execution, as described above. The centralized document system 110 may generate the document package per a request from an originating entity 140 of organization 135A. In some implementations, the document package may additionally include a set of document permissions. The centralized document system 110 may provide a means for the receiving entity 150 of organization 135B to request to assign the set of document permissions to a second receiving entity of organization 135B. In other implementation, the centralized document system 110 may scan the document package (including the document) to determine whether the document package includes a document of a particular type (e.g., identified by a policy of organization 135B), and if so, may provide the document package to additional receiving entities 150 of organization 135B not originally specified to receive the document package. In other implementations, the centralized document system 110 modifies the document package to be sent to a substitute receiving entity 150 based on the original receiving entity 150 being unavailable.

The centralized document system 110 can be a server, server group or cluster (including remote servers), or another suitable computing device or system of devices. In some implementations, the centralized document system 110 can communicate with user devices 160 over the network 120 to receive instructions and send document packages (or other information) for viewing on user devices 160. The centralized document system 110 will be discussed in further detail with respect to FIG. 2.

The network 120 transmits data within the system environment 100. The network 120 may comprise any combination of local area and/or wide area networks, using both wired and/or wireless communication systems, such as the Internet. In some embodiments, the network 120 transmits data over a single connection (e.g., a data component of a cellular signal, or Wi-Fi, among others), and/or over multiple connections. In some embodiments, the network 120 uses standard communications technologies and/or protocols. For example, the network 120 includes communication links using technologies such as Ethernet, 802.11, 3G, 4G, code division multiple access (CDMA), digital subscriber line (DSL), and the like. Data exchanged over the network 120 may be represented using any suitable format, such as hypertext markup language (HTML) or extensible markup language (XML). In some embodiments, the network 120 may include encryption capabilities to ensure the security of customer data. For example, encryption technologies may include secure sockets layers (SSL), transport layer security (TLS), virtual private networks (VPNs), and Internet Protocol security (IPsec), among others.

Through the network 120, the centralized document system 110 can communicate with user devices 160 associated with the users 130. A user 130 can represent an individual, group, or other entity that is able to interact with document packages (or other content) generated on and/or managed by the centralized document system 110. Each user 130 can be associated with a username, email address, or other identifier that can be used by the centralized document system 110 to identify the user 130 and to control the ability of the user 130 to view, modify, and otherwise interact with document packages managed by the centralized document system 110. In some implementations, users 130 can interact with the centralized document system 110 through a user account with the centralized document system 110 and one or more user devices 160 accessible to that user 130. In the embodiment of FIG. 1, the plurality of users 130 are split into users associated with organization 135A and users associated with the organization 135B.

As described above, an organization is a business, group, individual, or the like that is associated with a set of users 130 and one or more document packages in the centralized document system 110. For example, a document package may originate at organization 135A and be sent to organization 135B for viewing, editing, and execution. In a specific implementation, the document package may be created by originating entity 140 and be sent via the centralized document system 110 to a receiving entity 150 during the execution of the one or more documents included within the document package.

In the embodiment of FIG. 1, an originating entity 140 from the organization 135A creates the document package via the centralized document system 110. In this example, the organization 135A includes a set of originating entities 140 which, as used herein, are users 130 who have a user account with the centralized document system 110. The organization 135B includes a set of receiving entities 150 which, as used herein, are users 130 who have a user account with the centralized document system 110. The document package is sent by the centralized document system 110 for review and execution by a receiving entity 150 of the organization 135B.

Each user device 160 is a computing device capable of receiving user input (for example from a user 130) as well as transmitting and/or receiving data to the centralized document system 110 via the network 120. For example, a user device 160 can be a desktop or a laptop computer, a smartphone, tablet, or another suitable device. User devices 160 are configured to communicate via the network 120 (for example, with the centralized document system 110). In one embodiment, a user device 160 executes an application allowing a user 130 of the user device 160 to interact with the centralized document system 110. For example, a user device 160 can execute a browser application to enable interaction between the user device 160 and the centralized document system 110 via the network 120. In some embodiments, a single user 130 can be associated with multiple user devices 160, and/or one user device 160 can be shared between multiple users 130 who may, for example, log into a personal account on the user device 160 to access the centralized document system 110.

Example Centralized Document System Architecture

Figure 2:
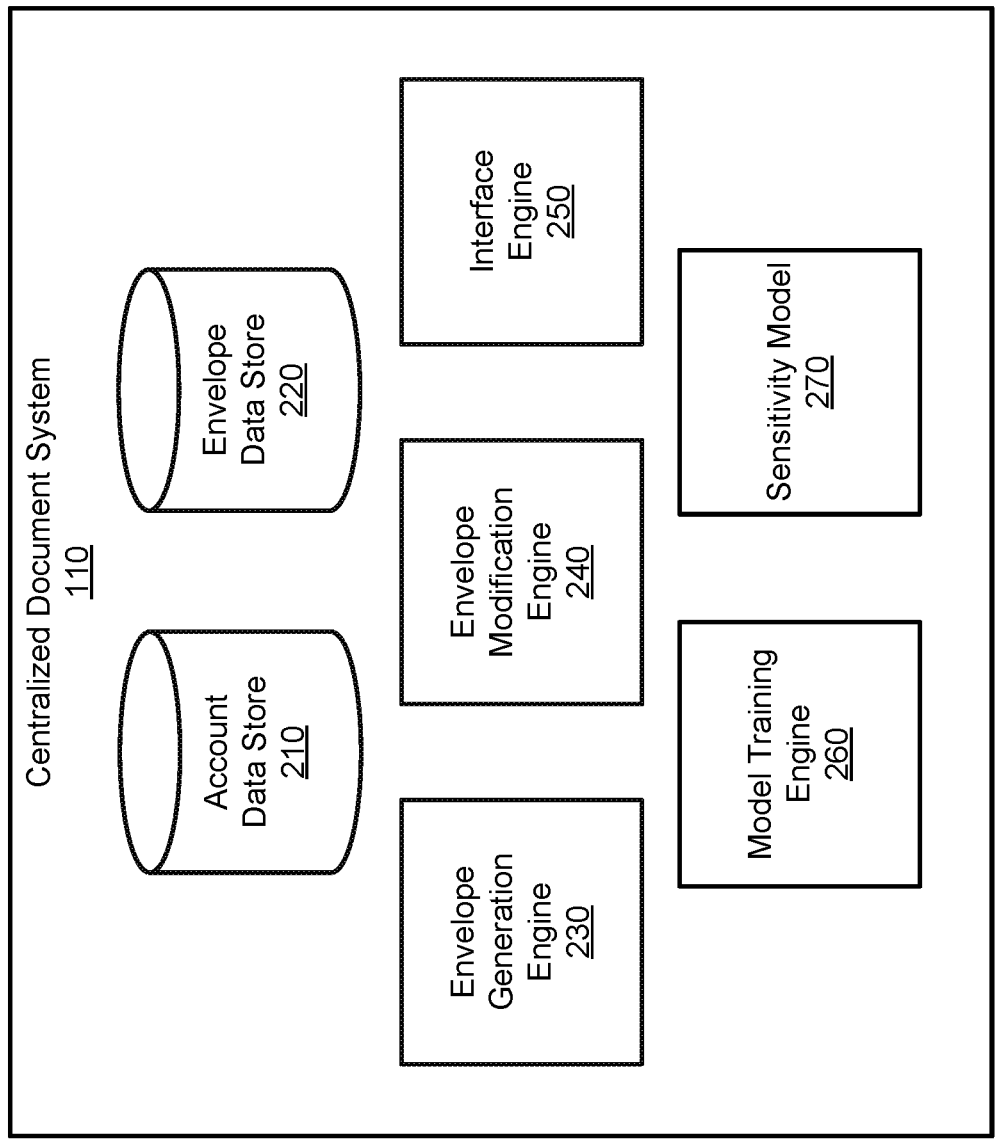
FIG. 2 is a block diagram of a centralized document system, according to one embodiment.

FIG. 2 is a block diagram of a centralized document system 110, according to one embodiment. Components of the centralized document system 110 may be a combination of hardware and software. The centralized document system 110 may include an account data store 210, an envelope data store 220, an envelope generation engine 230, an envelope modification engine 240, an interface engine 250, a model training engine 260, and a sensitivity model 270. In various embodiments, the centralized document system 110 may include fewer or additional components that are not shown in FIG. 2. For example, conventional components such as network interfaces, security functions, load balancers, failover servers, management and network operations consoles, and the like are not shown so as to not obscure the details of the system architecture. The functions of the centralized document system 110 may be distributed among the components in a different manner than described.

The account data store 210 is a file storage system, database, set of databases, or other data storage system storing information associated with accounts of the centralized document system 110. The organizations 135A and 135B may be associated with one or more accounts with the centralized document system 110. In some embodiments, an organization may be associated with a parent account and each entity within the organization may be associated with a user account. For example, the organization 135B has a parent account and each receiving entity 150 within the organization 135B has a user account with the centralized document system 110. The parent account may be associated with a policy of an organization and/or an org chart for the organization. A policy of the organization is a system of principles that guide certain processes or workflows for the organization. For example, a policy of organization 135B may dictate which receiving entities 150 within the organization 135B are to receive document packages and a set of tasks the receiving entities 150 are to perform in relation to the document package or a set of permissions the receiving entities 150 may be subject to in relation to the document package. In some embodiments, the policy specifies acting entities and corresponding sets of tasks for the acting entities to perform in relation to the document package based on document types and/or types of document content of the one or more documents included in the document package. In some embodiments, the policy specifies one or more thresholds corresponding to one or more types of document content (e.g., a payment amount, a payment term, etc.). For example, a policy may specify a threshold payment amount and corresponding acting entities and sets of tasks for the acting entities to perform if a payment amount within a document package exceeds the threshold payment amount. The org chart may include a list of entities (e.g., including names, titles, roles, departments, direct reports, supervisors, teams, groups, etc.) within the organization.

A policy of an organization may specify conditions under which a receiving entity can delegate a substitute receiving entity for executing documents. Conditions can indicate that the receiving entity is unavailable to execute the document. Example conditions include the presence of an automated reply message (e.g., an out-of-office message for an email service) or the current date falling within a vacation schedule as recorded with the organization (e.g., recorded on a software managed by a human resources department or a supervisor and accessible to the centralized document system 110). In one example, a policy specifies that if a receiving entity of an organization has an out-of-office message enabled for incoming emails, then document packages created by the originating entity and intended for the receiving entity may also be provided to substitute entities that the receiving entity has assigned appropriate permissions to act on their behalf. Conditions can additionally or alternatively indicate an urgency at which the document must be executed. For example, a document package may be sent with a flag indicating that urgent attention should be provided to the document package. The centralized document system 110 may determine the flag is present based on metadata of the document package indicating the content is urgent or perform object recognition on the documents with the package to determine words or images indicating urgency are present (e.g., words like "urgent" or "immediate" or images of an attention or warning sign).

Furthermore, an organization's policy may specify override conditions under which, despite the conditions being met for a substitute receiving entity to be delegated document packages intended for a receiving entity, the substitute receiving entity is prevented from receiving the document packages. The override conditions may indicate that the substitute receiving entity is not authorized to receive a document package or document having a particular sensitivity level. Sensitivity levels are described further below. The centralized document system 110 may determine not to delegate a document to a substitute receiving entity in response to determining that an override condition is met. In one example, an override condition indicates that the substitute receiving entity is not authorized to receive a document having a second sensitivity level. In this example, a condition for delegating a substitute entity may specify that the substitute receiving entity is authorized to receive a document having a first sensitivity level. After determining that the override condition is met, the centralized document system 110 prevents the document from being provided to the substitute receiving entity. The centralized document system 110 may still provide the document to the intended receiving entity.

A sensitivity level may be a metric for quantifying the sensitivity of a document. Sensitivity levels may correspond to amounts of sensitive content within a document, varieties of sensitive content, sensitivities of content within a document, or a combination thereof. Sensitive content may include personal identifiable information (PII), classified information (e.g., a business proposal or a trade secret), compensation values (e.g., a salary), medical information, or any suitable type of information that is not readily available to the public. An amount of sensitive content may be determined by the number of occurrences of sensitive information within a document (e.g., the number of times confidential medical information is mentioned in the document). A variety of sensitive content may be determined by the number of different types of sensitive information (e.g., as listed above with reference to the different types of sensitive content). A sensitivity of content may be determined according to a pre-defined or automatically determined categorization of sensitive content into groups with different criticalities of sensitivity. For example, a classified proposal for a government agency may be more sensitive than the birthday of an employee of an organization. The centralized document system 110 may receive pre-defined categories for sensitivity levels from a user (e.g., of the organization of the originating entity) or determine groups automatically based on a history of which documents were and were not delegated and corresponding document and entity attributes. For example, the centralized document system 110 may determine a first sensitivity level using a clustering algorithm that clustered classified documents having document attributes like the same document type and the same author and sent to an receiving entity having similar entity attributes (e.g., the IP address of the receiving entity) into the same cluster.

Each user account associated with an entity may include information about the entity, such as information about the individual with access to the user account, age of the account, frequency of account use, log of past account transactions, and the like. Information about the individual with access to the account may include the individual's name, email address, computing device(s) used to access the account, an Internet Protocol (IP) address used to access the account, title, role, or department in an organization, and the like. The individual's title is a title indicating their authority such as a position title or job title held by the individual with the organization. The individual's role is a function that the individual fulfills within their organization. For example, a title may be "General Counsel" and a role may be reviewing and executing agreements. The individual's department is a group within the organization where the individual works. For example, a department may be operations, finance, sales, human resources, purchases, legal, and the like. The term "entity attributes" may refer to information about the entity as described above.

The envelope data store 220 is a file storage system, database, set of databases, or other data storage system storing information associated with document envelopes. The organizations 135A and 135B provide one or more documents for execution to other organizations via envelopes. A document envelope (also referred to as a document package) can include at least one document for execution. The at least one document may have been previously negotiated by the organizations 135A and 135B. And, as such, the document may be ready for execution upon the creation of an envelope. The document package may also include recipient information and document fields indicating which fields of the document need to be completed for execution (e.g., where a receiving entity 150 should sign, date, or initial the document). The recipient information may include contact information for a receiving entity 150 (e.g., a name and email address). A document may be characterized by one or more document attributes such as an author of the document, a document type (e.g., a bank form or rental agreement), content of the at least one document (e.g., image or text), and a date at which the document was generated.

In some embodiments, the document package may also include a set of permissions. The set of permissions may be assigned by an originating entity 140. The set of permissions included in the document package define one or more actions that a receiving entity 150 can perform with regard to the document package. The one or more actions may include adding one or more additional receiving entities 150 to the document package, removing one or more receiving entities 150 from the document package, updating an order in which two or more receiving entities 150 receive the document package, updating one or more tasks of one or more receiving entities 150 of the document package, adding one or more additional documents to the document package, removing one or more documents from the document package, providing a notification (e.g., "Documents within document package need careful review") to one or more receiving entities 150 about the document package, and the like. For example, an originating entity 140 may set the following permissions for a document package: allow receiving entity 150 to add additional receiving entities 150, allow receiving entity 150 to remove one or more documents from the document package, allow receiving entity 150 to execute one or more documents, allow receiving entity 150 to modify one or more documents, and the like.

In some embodiments, the document package may also identify a first set of acting entities (e.g., the receiving entities 150 of organization 135B specified by the originating entity 140 that are to be provided with the document package), and for each acting entity, the document package may also identify a first set of tasks that the acting entity is to perform with regard to the document package. The first set of tasks may define what each acting entity is to do and complete before the at least one document of the document package can be executed. The set of tasks may include reviewing the at least one document, initialing the at least one document, signing the at least one document, providing information for the at least one document, and the like.

The envelope generation engine 230 may generate envelopes for a user 130 to send to a different user 130. For example, the envelope generation engine 230 may generate an envelope for organization 135A to send to organization 135B. In a specific implementation, the envelope generation engine 230 may receive instructions from the originating entity 140 of organization 135A to generate an envelope (also referred to as a document package) that will be sent to one or more receiving entities 150 of organization 135B. The envelope generation engine 230 may generate a document package that includes at least one document for execution. In an implementation, the envelope generation engine 230 may generate a document package that may also include a set of permissions corresponding to each document of the document package. In another implementation, the envelope generation engine 230 may generate a document package that identifies a first set of acting entities and for each acting entity a first set of tasks that each acting entity of the first set of acting entities is to perform with regards to the document package (for instance before the documents of the document package can be executed).

In some embodiments, the envelope generation engine 230 may provide the document package to one or more receiving entities 150 after the document package has been generated per a request from an originating entity 140. In alternative embodiments, the envelope generation engine 230 may provide the document package to one or more receiving entities 150 after the document package has been modified by the envelope modification engine 240. The envelope generation engine 230 may prevent the document package from being provided to a receiving entity of the one or more receiving entities 150 if the sensitivity model 270 indicates that there is a document in the package that has a sensitivity level for which the receiving entity is not authorized to perform operations (e.g., according to the originating entity's organization's policies). In one embodiment, the receiving entity's organization may authorize a sensitive document to be delegated but the originating entity's organization may not; the centralized document system 110 can determine to override the policy of the receiving entity's organization.

The centralized document system 110 may determine not to delegate a document package to a substitute receiving entity in response to determining that an override condition is met. In some embodiments, the override condition can be a rule set by a policy of originating entity 140. For example, a rule may specify that delegation is prohibited when a document has a particular sensitivity level, but is allowed when the document has a different sensitivity level. The envelope generation engine 230 may prevent the document from being provided to the substitute receiving entity. However, the envelope generation engine 230 may still provide the document to the intended receiving entity. The envelope generation engine 230 may determine a receiving entity's substitute receiving recipient(s) and provide a notification to the substitute receiving entity that a document package was prevented from being delegated to them due to the sensitivity of the document.

In some embodiments, the centralized document system 110 allows an originating entity to manually enable and disable whether a document package is sent to a substitute receiving entity. In this way, the centralized document system 110 may override a policy of the receiving entity's organization that allows the recipient entity to forward a document package to a substitute receiving entity. The manual override allows the originating entity to prevent any sensitive document from being seen and acted upon by a substitute receiving entity and provides security for the original receiving entity to be the only recipient. The centralized document system 110 may use the interface engine 250 to provide a user interface enabling an originating entity to enable or disable the delegation of a document package to a receiving entity's substitute receiving entity.

The centralized document system 110 may determine that a receiving entity has assigned multiple substitute receiving entities to delegate the execution of a document in the event that the receiving entity is unavailable. The envelope generation engine 230 may determine, based on rules that are specified by the policies of the receiving entity or the originating entity or based on rules selected by the receiving entity or the originating entity, a particular substitute receiving entity of the multiple substitute receiving entities to forward a document package rather than send the document package to each of the multiple substitute receiving entities. A rule may specify that if the document package includes document attributes meeting a particular criteria (e.g., including certain keywords, names, or financial amounts), that a substitute receiving entity having a particular title of authority receives the document package to execute on behalf of the intended receiving entity. In another example, a rule specified by a receiving entity may specify that if a contract amount is within a first range of values (e.g., less than 1 million), the document package is delegated to a first substitute receiving entity, if the contract amount is within a second range of values (e.g., between 1 and 1.5 million), the document package is delegated to a second substitute receiving entity, and if the contract amount is within a third range of values (e.g., greater than 1.5 million), the document package is delegated to a third substitute receiving entity. The interface engine 250 may generate a user interface for specifying these rules to the centralized document system 110.

The centralized document system 110 may determine a receiving entity, as specified by an originating entity, and determine that the receiving entity has not yet specified a substitute receiving entity. For example, the envelope generation engine 230 may query the account data store 210 for substitute receiving entities that have been assigned to the receiving entity and determine that none have been assigned. The centralized document system 110 may determine that the receiving entity is unavailable to execute a document in a document package (e.g., by determining that the receiving entity has an Out of Office message active on an emailing service that is in communication with the centralized document system 110 through an application programming interface of the centralized document system 110). In response to determining that both the receiving entity is unavailable to execute and that no substitute receiving entity has been assigned to the receiving entity, the centralized document system 110 may use a policy of the receiving entity's organization to determine to assign a substitute receiving entity to the receiving entity (e.g., automatically and without waiting for a confirmation from the receiving entity). For example, the organization's policy specifies that a substitute receiving entity of a particular title of authority in the receiving entity's department may be assigned as a substitute receiving entity automatically if no substitute receiving entity was assigned to the receiving entity at the time that they are determined to be unavailable to execute a document. Accordingly, the centralized document system 110 may assign one or more substitute receiving entities automatically, per an organization's policy, and the envelope generation engine 230 may provide a document package to the newly assigned substitute receiving entity for execution on behalf of the receiving entity.

The envelope modification engine 240 manages modifications made to a document package. In some embodiments, the modifications are requested by a user 130 (e.g., by a receiving entity 150) and provided to an originating entity for approval. In some embodiments, the modifications are automatically applied by the envelope modification engine 240 after requested by a user (such as the receiving entity 150).

In an implementation, where a document package has been provided to one or more receiving entities 150, the envelope modification engine 240 may receive a request from a first receiving entity 150 to assign a set of document permissions to a second receiving entity. For example, the first receiving entity 150 (such as an employee) may review the document package via a user interface of a user device 160B associated with the first receiving entity 150 and may request to assign a set of document permissions to the second receiving entity (such as a manager of the employee) via the user interface. The envelope modification engine 240 may receive the request and determine if the set of document permissions are included within the one or more document permissions of the document package (e.g., within the one or more document permissions assigned by the originating entity 140). In an embodiment, where the envelope modification engine 240 determines the set of document permissions requested by the receiving entity 150 is included in the permissions assigned by the originating entity 140, the envelope modification engine 240 may automatically assign the set of document permissions to the second receiving entity. In an embodiment, where the envelope modification engine 240 determines the set of document permissions is not included in the permissions assigned by the originating entity 140, the envelope modification engine 240 may request that the originating entity 140 confirm that the second receiving entity can be assigned the set of document permissions before assigning the set of document permissions to the second receiving entity.

In an example embodiment, the document package includes at least one document and one or more document permissions assigned by the originating entity 140. In this embodiment, the document permissions include allowing a receiving entity to perform the following actions with regard to the document package: add one or more additional receiving entities 150 to the document package and update an order in which two or more receiving entities 150 may receive the document package. The receiving entity 150 is provided the document package via the envelope generation engine 230.

Continuing with this example embodiment, in a first scenario, the receiving entity 150 requests that a second receiving entity be able to update an order in which two or more receiving entities 150 may receive the document package. In a second scenario, the receiving entity 150 requests that a second receiving entity be able to add one or more additional documents to the document package. In the first scenario, the envelope modification engine 240 receives the request and automatically assigns to the second receiving entity a permission to update an order in which two or more receiving entities 150 may receive the document package as this permission was included in the one or more document permissions assigned by the originating entity 140. In the second scenario, the envelope modification engine 240 receives the request and requests that the originating entity 140 confirm that the second receiving entity can be assigned a permission to add one or more additional documents to the document package as this permission was not included in the one or more document permissions assigned by the originating entity 140.

In embodiments where the envelope modification engine 240 requests that the originating entity 140 confirm the assignment of document permissions to a second receiving entity, the envelope modification engine 240 may receive a confirmation from the originating entity 140 and may, in response, assign the document permissions to the second receiving entity. In some embodiments, the envelope modification engine 240 may then provide the document package with the set of approved document permissions to the second receiving entity. In alternative embodiments, the envelope modification engine 240 may receive an indication from the originating entity 140 that the second receiving entity cannot be assigned the document permissions. The envelope modification engine 240 may provide a notification to the receiving entity 150 that the second receiving entity cannot be assigned the document permissions.

In another implementation, the envelope modification engine 240 may automatically apply modifications to the document package. In an embodiment, the document package generated by the envelope generation engine 230 includes at least one document to be executed and identifies a first set of acting entities (e.g., one or more receiving entities 150 of organization 135B), and for each acting entity, the document package also identifies a first set of tasks that the acting entity is to perform with regard to the document package. For example, the document package may specify two acting entities in the first set of acting entities with one entity to perform a review of the at least one document in the document package and a second entity to sign the at least one document.

The envelope modification engine 240 may access a policy of the organization 135B stored in the account data store 210. As described above, a policy of an organization may specify which entities within the organization are to receive document packages and a set of tasks the entities may perform in relation to the document package. In order to determine if the document package should be modified to be sent to additional entities within organization 135B, the envelope modification engine 240 scans the document package. During the scan, the envelope modification engine 240 scans the document(s) and the first set of acting entities defined by the originating entity 140 during generation of the document package. In some embodiments, the envelope modification engine 240 may scan the at least one document to determine whether the at least one document is of one or more document types identified in the policy of the organization 135B and may scan the first set of acting entities to determine whether the set includes the entities identified in the policy per document type. The document types are categories of documents and may include a purchase agreement, a confidentiality agreement, a rental agreement, an employee agreement, a sales contract, a bank form, and the like. In response to the document package including a document of the one or more document types identified by the policy and the first set of acting entities not including one or more entities defined by the policy for the document type, the envelope modification engine 240 may automatically modify the first set of acting entities to include one or more additional entities (e.g., a second set of acting entities) based on the policy. The envelope modification engine 240 may perform this modification without requesting permission or confirmation from the originating entity 140.

In some embodiments, the envelope modification engine 240 may receive a sensitivity level as determined by the sensitivity model 270 and modify a document in a document package based on the sensitivity level. The sensitivity level may correspond to a particular type of sensitive content that may be removed or abstracted from the document, altering the sensitivity level of the document to another sensitivity level for which the substitute receiving entity may be authorized to perform actions on behalf of the receiving entity. For example, the envelope modification engine 240 receives a determined third sensitivity level from the sensitivity model 270, where a third sensitivity level indicates that an employee's salary is included in the document. The envelope modification engine 240 may determine, based on the third sensitivity level and the association with salaries, locations in a document where a salary is located. The envelope modification engine 240 may remove the salary or replace it with an abstraction (e.g., "[redacted]"). In this way, a partial redaction of sensitive information may enable a document to be timely executed without compromising sensitive information.

In an example scenario, the generated document package may include a purchase agreement and a first set of acting entities that includes one receiving entity 150 at organization 135B who is to perform a set of tasks including to review and sign the purchase agreement. The envelope modification engine 240 accesses a policy of organization 135B associated with receiving entity 150. The policy identifies sets of acting entities corresponding to a purchase agreement (a document type). Each set of acting entities identified in the policy also correspond to sets of tasks that each acting entity is to perform before the at least one document can be executed. The envelope modification engine 240 scans the document package and determines the document to be a purchase agreement and the first set of acting entities to not include two acting entities identified in the policy corresponding to a purchase agreement. As such, the envelope modification engine 240 automatically modifies the first set of acting entities to include the two acting entities. The modified document package may be provided to the first set of acting entities and the two acting entities (e.g., a second set of acting entities) where the first set of acting entities can review and sign the purchase agreement and the second set of acting entities can perform the set of tasks identified in the policy (e.g., initial the purchase agreement).

In some embodiments, the envelope modification engine 240 may scan the document(s) of the document package to determine whether the document(s) includes one or more types of document content identified by the policy. The envelope modification engine 240 may scan a document by identifying text of the at least one document (e.g., using object recognition techniques) and performing natural language processing on the identified text (e.g., using a heuristic solution, a machine-learned model, etc.) to identify the one or more types of document contents. A type of document content is words, phrases, clauses, or other content and may include a payment amount, a payment term, a late payment penalty, a limited liability clause, a product or service, and the like. In response to the document package including at least one type of document content identified by the policy, the envelope modification engine 240 may automatically modify the first set of acting entities to include one or more additional entities (e.g., a third set of acting entities) based on the policy.

In an example scenario, the generated document package may include a sales contract and a first set of acting entities that includes one receiving entity 150 at organization 135B who is to perform a set of tasks including reviewing and signing the sales contract. The envelope modification engine 240 accesses a policy of organization 135B and identifies a set of acting entities (e.g., a second set of acting entities) corresponding to a sales contract (a document type) and a set of acting entities (e.g., a third set of acting entities) corresponding to a payment amount (a type of document content)

and a payment term (another type of document content). Each set of acting entities identified in the policy also corresponds to sets of tasks that each acting entity is to perform before the at least one document can be executed. The envelope modification engine 240 scans the document package and determines the document to be a sales contract and to include a payment term identified by the policy. Based on the scan, the envelope modification engine 240 determines the first set of acting entities does not include one acting entity of the second set and one acting entity of the third set. In response, the envelope modification engine 240 automatically modifies the first set of acting entities to include the two acting entities. The modified document package may be provided to the first set of acting entities and the two acting entities where the first set of acting entities can review and sign the sales contract and the two acting entities (one from the second set and one from the third set) can perform the set of tasks identified in the policy (e.g., initialing the purchase agreement).

In some embodiments, where a document includes a payment amount as a type of document content, the envelope modification engine 240 compares the payment amount to a threshold payment amount included in the policy. In response to the payment amount being greater than the threshold payment amount, the envelope modification engine 240 may automatically modify the first set of acting entities to include one or more additional entities based on the policy. For example, the policy of organization 135B specifies a threshold payment amount of $500,000, a set of acting entities at organization 135B corresponding to the threshold payment amount, and a set of tasks for the acting entities to perform. The envelope modification engine 240 identifies a payment amount of $1 million in a document of a document package to be sent to organization 135B and compares the payment amount to the threshold payment amount. Based on the comparison, the envelope modification engine 240 automatically modifies a first set of acting entities to include the set of acting entities specified in the policy corresponding to the threshold payment amount.

In some embodiments, where a document includes a payment term as a type of document content, the envelope modification engine 240 compares the payment term to a threshold payment term included in the policy. In response to the payment term being greater than the threshold payment term, the envelope modification engine 240 may automatically modify the first set of acting entities to include one or more additional entities based on the policy. For example, the policy of organization 135B specifies a threshold payment term of 30 days, a set of acting entities at organization 135B corresponding to the threshold payment term, and a set of tasks for the acting entities to perform. The envelope modification engine 240 identifies a payment term of 60 days in a document of a document package to be sent to organization 135B and compares the payment term to the threshold payment term. Based on the comparison, the envelope modification engine 240 automatically modifies a first set of acting entities to include the set of acting entities specified in the policy corresponding to the threshold payment term.

In some implementations, where the document package has been provided to one or more receiving entities 150, the envelope modification engine 240 may receive an indication that a receiving entity 150 is unavailable to execute the at least one document of the document package. In some embodiments, the envelope modification engine 240 may receive an out of office message from an email account associated with the receiving entity 150. In some embodiments, the envelope modification engine 240 may receive a message from the organization 135B indicating that the receiving entity 150 is unavailable. In some embodiments, the envelope modification engine 240 may determine the receiving entity 150 is unavailable based on the receiving entity 150 not accessing the document package within a threshold amount of time (e.g., 12 hours, 24 hours, etc.).

In response to receiving the indication, the envelope modification engine 240 may identify a substitute receiving entity 150 within the organization 135B to provide the document package to. The envelope modification engine 240 may identify the substitute entity based on one or more rules of the organization 135B. The one or more rules specify how the envelope modification engine 240 is to identify a substitute entity to provide the document package to when a receiving entity 150 is unavailable. For example, one rule may specify that the envelope modification engine 240 identifies a substitute entity by querying the org chart of the organization 135B stored in the account data store 210 and identifying an entity within the org chart that satisfies one or more document package requirements as the substitute entity.

The one or more document package requirements are necessary conditions that a substitute entity should satisfy. The one or more document package requirements may include a threshold title, a threshold role, and/or a threshold department. In some embodiments, the threshold title, the threshold role, and the threshold department are dynamic and may be based on the title, role, and department of the receiving entity 150. In some embodiments, the threshold title, the threshold role, and the threshold department are set by the organization 135B of the receiving entity 150 regardless of the title, role, and department of the receiving entity 150. The envelope modification engine 240 may review the org chart and select an entity as a substitute entity when the entity's title, role, and/or department meets or exceeds the threshold title, role, and/or department. For example, a threshold title is 'Level II Sales Manager,' a threshold role is sales contracts review, and a threshold department is Sales and a substitute entity must have a title of at least a 'Level II Sales Manager' and must satisfy the threshold role and threshold department.

In another example, a second rule may specify that the envelope modification engine 240 identify a substitute entity that is a supervisor or manager of the organization 135B. The envelope modification engine 240 may determine this by querying the various user accounts of individuals within the organization 135B from the account data store 210 or by querying an org chart of the organization 135B, and/or by identifying entities with a title that includes 'supervisor' or 'manager'.

In some embodiments, the envelope modification engine 240 may identify a substitute entity by receiving an identity of a candidate substitute entity from the organization 135B. The envelope modification engine 240 may provide the identity of the candidate substitute entity to the originating entity 140 for approval. Based on receiving approval from the originating entity 140, the envelope modification engine 240 may select the entity as the substitute entity.

Once a substitute entity is identified, the envelope modification engine 240 may modify the document package based on the identified substitute entity. In some embodiments, the envelope modification engine 240 may update the recipient information of the document package to include the substitute entity's contact information. In some embodiments, the envelope modification engine 240 may change information associated with the receiving entity 150 within a document included in the document package to corresponding information associated with the substitute entity. For example, the envelope modification engine 240 may update a signature field within the document to include the substitute entity's information (name, title, etc.).

The interface engine 250 may generate user interfaces allowing users 130 to interact with document packages managed by the centralized document system 110. For example, the interface engine 250 may generate a user interface for an originating entity 140 to generate a document package. In another example, the interface engine 250 may generate a user interface for a receiving entity 150 to view a document package. In some implementations, the interface engine 250 may provide a user interface enabling a receiving entity 150 to modify a document package. For example, the interface engine 250 may display a listing of the one or more receiving entities 150 of the document package to a receiving entity 150 on an electronic display of a user device 160B. The interface engine 250 may provide one or more interface elements (e.g., links, buttons, checkboxes, etc.) on the electronic display for the receiving entity 150 to select in order to request to assign a set of document permissions to an additional receiving entity 150. In some implementations, the interface engine 250 may generate a user interface for displaying a notification to a receiving entity 150 that an additional receiving entity 150 cannot be assigned the set of document permissions. The interface engine 250 and an example user interface will be discussed further in relation to FIGS. 4-7.

The model training engine 260 trains a model to identify sensitive documents. In some embodiments, the model training engine 260 trains the model to determine a sensitivity level of a document. The model training engine 260 may train a machine learning model in multiple stages. In a first stage, the model training engine 260 may use records of previously distributed documents and corresponding receiving entities collected across one or more users to train a machine learning model. This data from a population of users may be referred to as "general data" or "generalized data." The model training engine 260 may label the general data with a label representative of a sensitivity level of the historical document. In addition to using a document to train a machine-learned model, the model training engine 260 may also use a document package, collective document attributes of the documents within the package, and entity attributes of recipients of the document package.

By using a combination of document and entity attributes, the centralized document system can increase the accuracy at which the machine-learned model can determine the likelihood that a document is sensitive in addition to refining the distribution decision of sensitive documents to substitute receiving entities. In some embodiments, the machine-learned model can determine how a document containing sensitive information (e.g., as indicated by document attributes) is sensitive relative to the recipient of the document. For example, medical information may be sensitive information that one type of substitute entity (e.g., a supervisor) should not see but is okay for a different type of substitute entity (e.g., the assistant) to see. In an example scenario where a receiving entity has established both a supervisor and an assistant as substitute receiving entities, the centralized document system may determine to provide the document to the assistant but not the supervisor. This way, the centralized system maintains the security of the sensitive information while avoiding delays that may be caused by simply prohibiting the sensitive information to be sent to any substitute receiving entity while the intended recipient is unavailable to execute a sensitive document. Furthermore, the centralized document system has determined how a sensitive document is relative to a recipient. For example, the sensitivity level of a document may be a first level relative to entity attributes of the supervisor and a second level relative to the entity attributes of the assistant.

The model training engine 260 may create a first training set based on the labeled general data. The model training engine 260 trains a machine learning model (e.g., the sensitivity model 270), using the first training set, to determine a sensitivity level of a document or document package. In some embodiments, the machine learning model is configured to receive, as an input, a feature vector of document or entity attributes, and output a sensitivity level associated with the document package (e.g., a sensitivity level of a document in a document package). The envelope generation engine 230 or the model training engine 260 may determine a feature representations of documents or entities, which is further described below with respect to creating a training set.

In a second stage of training, the model training engine 260 can use user-specific document packages and recipients to create a second training set. The model training engine 260 may use document attributes of the document packages and entity attributes of the recipients to determine labels for the user-specific data, where the labels correspond to respective sensitivity levels. If a previously determined sensitivity level by the trained model resulted in the prevention of distributing a document package to a substitute receiving entity that a receiving entity or an originating entity would have manually specified should not receive the document package, which may be determined by the centralized document system 110 identifying that a user did not override the automated decision, the model training engine 260 may create the second training set that includes user-specific data labeled to indicate the sensitivity level of the document package was correctly identified by corresponding document or entity attributes. The model training engine 260 then trains the machine learning model using the second training set such that the machine learning model is customized to the user's desired categorization of documents into sensitivity levels.

To create a training set, the envelope generating engine 230 or the model training engine 260 may determine one or more feature vectors associated with document attributes or entity attributes. For example, the model training engine 260 may determine a document feature vector, which may be referred to as a "document feature representation," characterizing a document or document package. The document feature vector may be composed of numerical representations of document or entity attributes. For example, object recognition applied to a document may recognize a salary or other sensitive information within a document, and the presence of sensitive information within a document may be represented by a binary flag. In another example, content recognized by object recognition may be categorized into categories of sensitivity that may be user-specified or determined by the centralized document system 110 (e.g., similar to the sensitivity levels), and the categories may correspond to respective numerical values that are used to generate a document feature vector.

In some embodiments, the model training engine 260 may retrain a machine-learned model using user feedback received from a user device of a receiving entity. The model training engine 260 receives feedback of a sensitivity level determined by the sensitivity model 270 or the distribution of a document package or lack thereof based on the determined sensitivity level indicating a measure of approval that the user has with the output of the sensitivity model 270. For example, the user may provide feedback through a GUI, where the feedback is an approval or rejection of the prevention of distributing a sensitive document to a substitute receiving entity. The model training engine 260 may modify an association between the determined sensitivity level and document or entity attributes used by the sensitivity model 270 to determine the sensitivity level. For example, in response to the user providing a measure of approval indicating disapproval, the model training engine 260 reduces weights applied to entity or document attributes. When the modified association, including the reduced weights, is used to retrain a machine-learned model, the model training engine 260 may cause a decrease in the likelihood of the same sensitivity level to be determined for a subsequently generated document package and a corresponding substitute receiving entity with similar attributes.

In response to the user providing a measure of approval indicating approval of the sensitivity determination, the model training engine 260 may increase a weight applied to document or entity attributes used to make the successful determination. For example, the model training engine 260 may increase the weight placed upon a title of authority (e.g., a job title) of a substitute receiving entity and the presence of sensitive text in a document after such attributes were used to successfully determine a manner of distributing a document package (e.g., preventing a sensitive document from being sent to a substitute receiving entity that should not receive the document). Examples of measures of approval may include direct feedback such as a rating of the distribution (e.g., a star rating system) or indirect feedback such as a request to modify the distribution (e.g., a request to send the document package to a substitute entity despite a determination by the centralized document system 110 not to send the package), which may indicate disapproval with the sensitivity level determined by the sensitivity model 270.

The sensitivity model 270 determines a sensitivity level of a document. The sensitivity model 270 may categorize the sensitivity of a document according to levels. There may be two levels indicating whether the document contains or does not contain sensitive content. There may be more than two levels for various types of sensitive content. For example, a first sensitivity level may indicate that there is no sensitive content in a document, a second sensitivity level may indicate that there is a first type of sensitive content, and a third sensitivity level indicating that there is a second type of sensitive content. The types of content corresponding to respective sensitivity levels may be user-specified. For example, a user may specify that the contents of a classified business proposal are a first type of sensitive content and a salary is a second type of sensitive content. The model training engine 260 may determine the types of sensitive content of documents based on document and/or entity attributes and a clustering algorithm to determine respective attributes characterizing different types of sensitive content.

The centralized document system 110 can determine to use the sensitivity model 270 in response to determining that a policy of a receiving entity's organization specifies that a substitute receiving entity is authorized to receive the document package. In one embodiment, a policy may specify that the substitute receiving entity is authorized during a certain time period. For example, a receiving entity submits their vacation schedule to their human resources department, where the organization authorizes substitute entities to execute documents on behalf of employees during their absence. In another embodiment, a policy may specify that the substitute receiving entity is authorized if the receiving entity has set up an automated reply to their emails (e.g., an out-of-office response). The centralized document system 110 can determine if there is a substitute receiving entity that will be receiving a document package as the receiving entity's delegate. For example, the centralized document system 110 may have access to the receiving entity's schedule (e.g., manually provided by the receiving entity or accessed by communicating with an organization's human resources system). In another example, the centralized document system 110 may determine if any automated email responses have been received by the originating entity or the centralized document system within a time window (e.g., within the past week) for document envelopes previously sent to the receiving entity. If a substitute receiving entity is actively assisting a receiving entity with executing documents, the centralized document system 110 can apply the sensitivity model 270 to determine whether the document should be delegated. Else, the centralized document system 110 may determine that the receiving entity is available to execute the document, sensitive or not, and skip applying the sensitivity model 270 to a document. In this way, the centralized document system 110 can increase the efficiency at which processing resources are expended.

The sensitivity model 270 may be a machine-learned model trained using labeled representations of historical documents characterized by respective document attributes to determine the document package includes the at least one document categorized as sensitive, where labels of the labeled historical documents indicate respective sensitivity levels. The sensitivity model 270 may further output a confidence score indicating a likelihood that the sensitivity level is appropriately labeled as output. For example, the sensitivity model 270 may indicate that a document containing a residential address has a first sensitivity level with a confidence of 80%, has a second sensitivity level with a confidence of 30%, and has a third sensitivity level with a confidence of 5%. The centralized document system 110 may maintain and apply multiple machine learned models for determining respective sensitivity levels. In some embodiments, the centralized document system 110 may use the determined confidence score of the sensitivity levels and a threshold confidence score (e.g., 80%) to determine that a particular sensitivity level is appropriate for a document or document package. For example, the sensitivity level model 270, for a document, outputs a second sensitivity level with confidence score of 81%, and the centralized document system 110 compares the score to a threshold confidence score of 80% to determine that the sensitivity level of the document is indeed the second sensitivity level.

Machine learning models of the centralized document system 110 may use various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, a supervised or unsupervised learning algorithm, or any suitable combination thereof.

Alternatively, the sensitivity model 270 may be a statistical model generated based on previously distributed documents and corresponding substitute recipients permitted to perform actions with regard to the documents. The sensitivity model 270 may determine a correlation between document attributes and entity attributes that are permitted to perform actions. Based on the determined correlation, the sensitivity model 270 may determine a likelihood that a given document with corresponding document attributes may be distributed to a particular receiving entity with corresponding entity attributes, indicating a sensitivity level of the document for the receiving entity.

Further yet, the model described herein may be a rules-based decision model that determines a sensitivity level of a document based on a test of various rules or conditions. In some embodiments, the sensitivity model 270 is a rules-based model that specifies at least one document is categorized into a sensitivity level based on document attributes or entity attributes. In a first example of applying rules to determine the sensitivity level of a document, a rule of the rules-based model specifies that a document is categorized into a sensitivity level in response to determining that an author of the document (e.g., an originating entity) has a job title associated with high sensitivity documents (e.g., a threshold title). In a second example, a rule of the rules-based model specifies that a document is categorized into a sensitivity level in response to determining that a text of the at least one document includes a compensation value (e.g., a salary) of a receiving entity.

Figure 3:
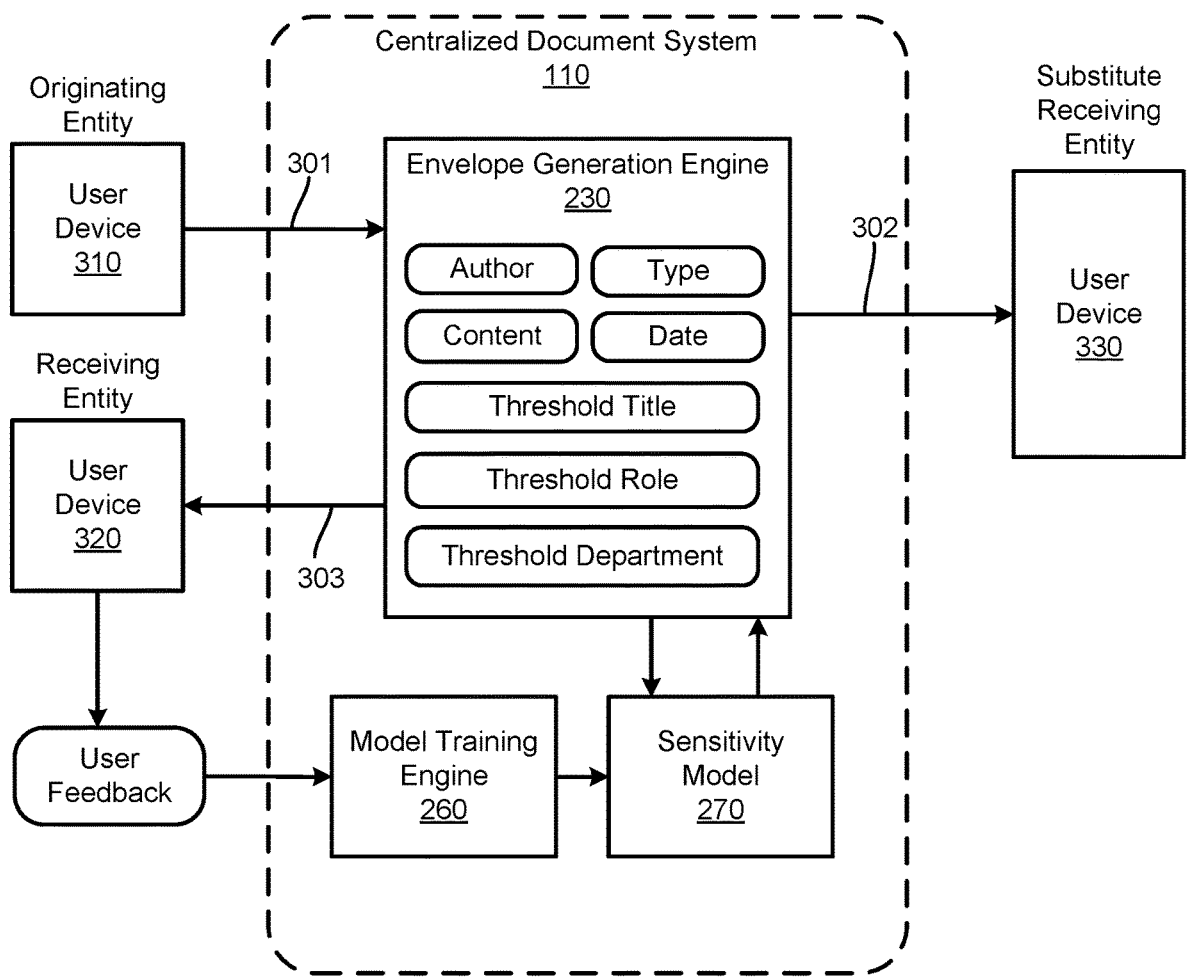
FIG. 3 is a block diagram of a feedback loop for optimizing sensitivity determination by a centralized document system, according to one embodiment.

FIG. 3 is a block diagram of a feedback loop 300 for optimizing sensitivity determination by a centralized document system, according to one embodiment. The feedback loop 300 is a closed-loop system that minimizes an error rate of sending a sensitive document to an unintended substitute recipient. The feedback loop may be performed using the centralized document system 110 and a user device 320 of a receiving entity intended to receive a document package from an originating entity generating the document package using a user device 310. The user device 230 provides user feedback to the centralized document system 110 to optimize subsequent determinations of whether to distribute sensitive documents to a user device 330 of a substitute receiving entity. The feedback loop 300 may have alternative configurations than shown in FIG. 3, including different, fewer, or additional components.

The optimization of the distribution of a document package to a substitute receiving entity may begin with a request 301 from the user device to generate a document package using the envelope generation engine 230 of the centralized document system 110. The envelope generation engine 230 may determine document attributes of the document package such as an author, a document type, content, or a date of generation of a document in the document package. The content can include a text, an image, or a graphic. For example, a document can include text of a residential address that is sensitive to the receiving entity or a graph of classified data. The envelope generation engine 230 may determine entity attributes of recipients (e.g., the receiving entity of the user device 320 and the substitute receiving entity of the user device 330). Entity attributes may include at least one of a title in an organization, role in the organization, department in the organization, an Internet Protocol (IP) address, historical document packages executed by the second receiving entity, the name of the organization, an org chart of the organization, or a policy of the organization. The title, role, and department may be a threshold title, threshold role, and threshold department.

The envelope generation engine 230 may use the sensitivity model 270 and the determined attributes (e.g., document and entity attributes) to determine a sensitivity level of the document package. For example, where the sensitivity model 270 is a machine-learned model, the envelope generation engine 230 determines feature vectors representing the document package, receiving entity or entities, or combination thereof. The sensitivity model 270 may be applied to the feature vectors to determine a sensitivity level associated with the document package and corresponding recipients. The sensitivity model 270 may be trained using training data sets (e.g., feature vectors from historical documents and recipients of the documents) generated by the model training engine 260. The sensitivity model 270 provides the determined sensitivity level of the document package to the envelopment generation engine 230, which then determines whether to delegate the document package to the substitute receiving entity 330 based on the sensitivity level. For example, while the receiving entity may have originally specified that the substitute receiving entity is allowed to sign documents on behalf of the receiving entity, the document package generated by the originating entity may have sensitive information that a policy of the originating entity's organization specifies cannot be forwarded to a substitute receiving entity or that the receiving entity does not want the substitute receiving entity to see.

The sensitivity level output by the sensitivity model 270 may be a numerical representation of the likelihood that the sensitive information is present. For example, a first sensitivity level may indicate that no sensitive information is present and the document package may be sent 302 to the user device 330. In another example, although not depicted in FIG. 3, a second sensitivity level may indicate that sensitive information is present that should not be seen by the substitute receiving entity (e.g., as defined by a policy of the originating entity's organization), and the envelope generation engine 230 prevents the document package from being sent to the user device 330. In yet another example, a third sensitivity level may indicate that sensitive information is present but is still appropriate for the substitute receiving entity to see, and the envelope generation engine 230 may send 302 the document package to the user device 330.

The envelope generation engine 230 may send 303 a confirmation to the user device 320 that the document package was sent 302 to the substitute receiving entity. The receiving entity may provide user feedback of the decision by the centralized document system 110 to distribute the document package to the substitute receiving entity. The feedback may include a modification to the decision (e.g., sending the document package despite the system's decision not to send it). The feedback may include a rating of the decision (e.g., a thumbs up or thumbs down). This feedback is used by the model training engine 260 to retrain the sensitivity model 270. The retraining is described further with respect to the description of the model training engine 260 of FIG. 2. The feedback may be received through a user interface generated by the interface engine 250. Accordingly, feedback provided by the user through an interface allows the centralized document system 110 to personalize and optimize the determined sensitivity level and document package distribution to a user's sensitivity preferences.

Although the user feedback is shown in FIG. 3 as directly received by the centralized document system 110 from the user device 320, in some embodiments, the user feedback may be provided to the user device 310 for approval before being provided to the centralized document system 110. For example, the originating entity may approve or deny a request from the receiving entity to provide a sensitivity document to the substitute receiving entity, where the request is one embodiment of user feedback that could be used to train the sensitivity model 270. In some embodiments, the originating entity may provide user feedback to the centralized document system 110 of distribution decisions of sensitive documents. For example, the centralized document system 110 provides for display on the user device 310 a list of document packages that were not provided to the user device 330 based on a particular sensitivity level and the policy of the originating entity's organization specifying that documents having the particular sensitivity level are not to be provided to substitute receiving entities. The originating entity 310 may provide feedback to the centralized document system 110 that the sensitivity level was mischaracterized and that a document should have been provided to the substitute receiving entity, and the model training engine 260 may use this feedback to retrain the sensitivity model 270.

Example User Interfaces

Figure 4:
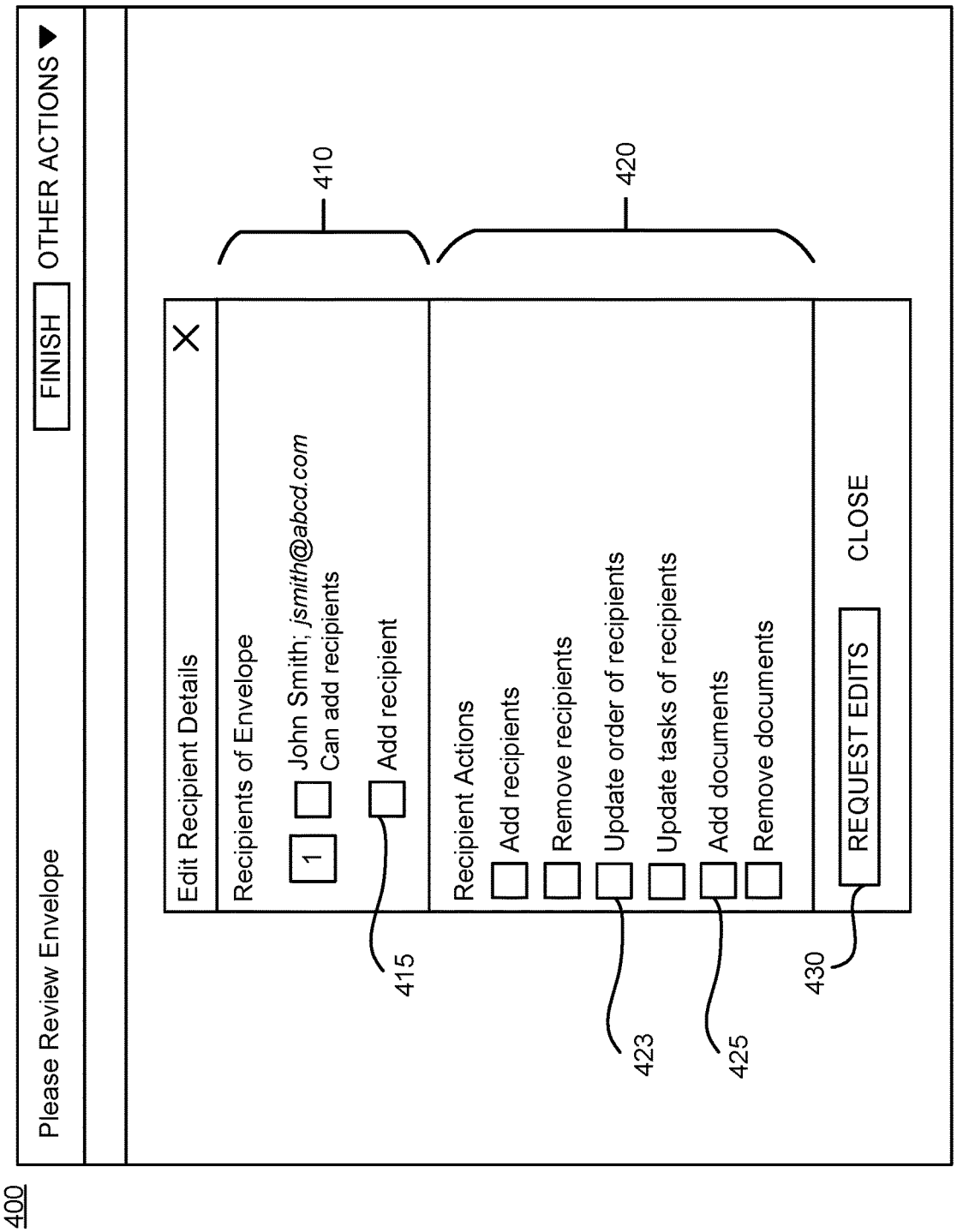
FIG. 4 illustrates an example user interface for editing recipients of a document package, according to one embodiment.

FIG. 4 illustrates an example user interface 400 for editing recipients of a document package. The user interface 400 may be viewed from the perspective of a receiving entity 150 on a user device 160B. The user interface 400 may be generated by the interface engine 250. The user interface 400 includes a recipient editing portion 410 and a permission editing portion 420. In alternative configurations, different and/or additional user interface elements may be included in the user interface 400.

In the embodiment of FIG. 4, a document package (also referred to as an envelope) has been generated by a centralized document system 110 and provided to a receiving entity 150 (e.g., John Smith). The document package includes one or more document permissions assigned by an originating entity 140 to the receiving entity 150. As described above, the one or more document permissions define one or more actions the receiving entity 150 may perform in regard to the document package.

In the embodiment of FIG. 4, the recipient editing portion 410, according to some embodiments, allows the receiving entity 150 (e.g., John Smith) to add one or more additional recipients (e.g., add one or more additional receiving entities 150 to receive the document package) by selecting checkbox 415. In an example, by selecting the checkbox 415, the receiving entity 150 may add a second receiving entity to the document package. In some embodiments, to add the second receiving entity, the receiving entity 150 (John Smith) may be asked to type in the second receiving entity's name or email address into a text box displayed in the user interface 400. In some embodiments, to add the second receiving entity, the receiving entity 150 may select the second receiving entity from a dropdown menu displayed in the user interface 400.

In the embodiment of FIG. 4, the permission editing portion 420, according to some embodiments, allows the receiving entity 150 to request to assign a set of document permissions to the second receiving entity. For example, the receiving entity 150 may request to assign the following document permissions to the second receiving entity: a permission to update an order of the recipients of the document package and a permission to add documents to the document package. The receiving entity 150 may do so by selecting checkbox 423 and checkbox 425. After the receiving entity 150 is done selecting which document permissions to assign to the second receiving entity, the receiving entity 150 may select button 430 to submit the request to the centralized document system 110. The centralized document system 110 automatically assigns the set of document permissions to the second receiving entity if the set of document permissions was included in the one or more document permissions assigned to the receiving entity 150 by the originating entity 140.

The centralized document system 110 requests that the originating entity 140 confirm that the second receiving entity can be assigned the set of document permissions if at least one of the set of document permissions is not included in the one or more document assigned to the receiving entity 150. If the originating entity 140 confirms the assignment, the centralized document system 110 provides the second receiving entity with the set of document permissions, and if not, a notification may be provided to the receiving entity 150 via the user interface 400 indicating the second receiving entity cannot be assigned the set of document permissions. In some embodiments, if the set of document permissions assigned by the receiving entity 150 to the second receiving entity includes some permissions that were assigned to the receiving entity 150 by the originating entity 140 and some that were not, the permissions in the set of document permissions that were assigned to the receiving entity 150 are automatically assigned to the second receiving entity, and the permissions that were not assigned to the receiving entity 150 by the originating entity 140 are provided to the originating entity for confirmation before being assigned to the second receiving entity.

FIG. 5 illustrates an example user interface 500 for viewing a history of created document packages, according to one embodiment. The user interface 500 may be viewed from the perspective of a receiving entity 150 on a user device 160B. The user interface 500 may be generated by the interface engine 250. The user interface 500 includes an envelope history panel 510 and a sorting and filtering panel 520. In alternative configurations, different and/or additional user interface elements may be included in the user interface 500.

The envelope history panel 510 includes identifiers of document packages received for execution by the receiving entity 150. The sorting and filtering panel 520 includes user inputs for sorting or filtering the document packages according to one or more parameters, which can include whether the package was provided to a substitute receiving entity for execution on behalf of the receiving entity, a name of substitute receiving entity that executed (e.g., signed) a document in the document package, a name of the document package, and whether the document package contains a sensitive document (e.g., as determined by the centralized document system 110). The interface engine 250 may update the user interface 500 according to a user's selection of a user input field (e.g., an entry of a scroll-down menu of parameters through which to sort the panel 510 or a checkbox of parameters through which to filter the entries in the panel 510).

Figure 6:
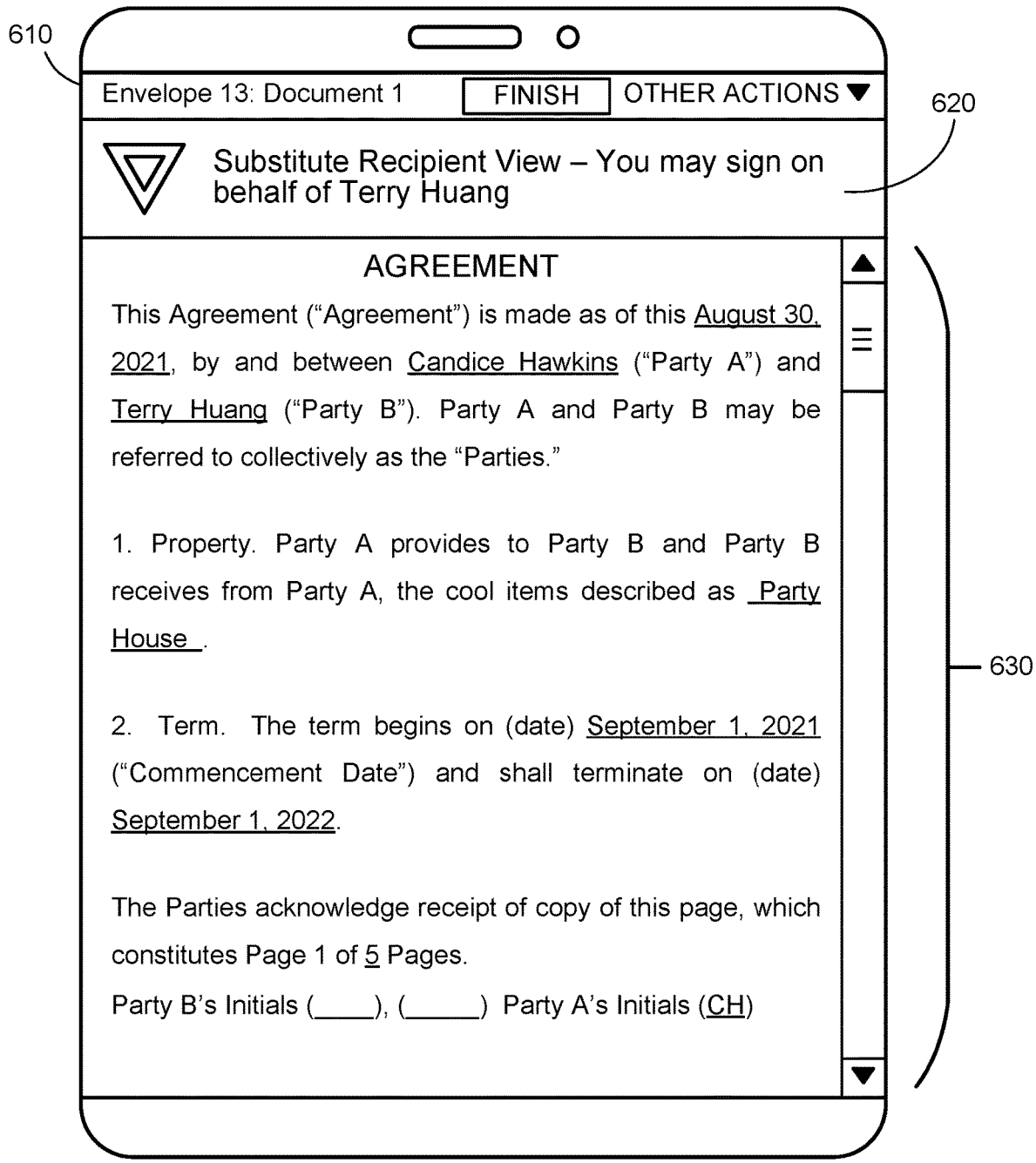
FIG. 6 illustrates an example user interface including an interface element notifying a receiving entity of a permission to perform an action in regard to a document package, according to one embodiment.

FIG. 6 illustrates an example user interface 600 including an interface element notifying a receiving entity of a permission to perform an action in regard to a document package, according to one embodiment. The user interface 600 may be viewed from the perspective of a substitute receiving entity on a user device 610. The user interface 600 may be generated by the interface engine 250. The user interface 600 includes an banner 620 and a document panel 630. In some embodiments, the user interface 600 is rendered after the centralized document system 110 determines to follow an organization's policies (e.g., a receiving entity's organization's policies) that specify the substitute receiving entity should receive document packages to execute on behalf of a receiving entity. In alternative configurations, different and/or additional user interface elements may be included in the user interface 600.

The banner 620 enables the centralized document system 110 to notify the substitute receiving entity that a document displayed in the document panel 630 is being interacted on behalf of a receiving entity. For example, a substitute receiving entity may have been delegated by receiving entity Terry Huang as having document permissions to sign a document on behalf of Terry. Accordingly, the banner 620 includes a message to the substitute receiving entity that they may sign on behalf of Terry. The electronic signature applied to the document displayed in the document panel 630 may be the signature or initials of the substitute receiving entity with a note or metadata embedded in the document that the intended signee authorized the substitute receiving entity to sign on their behalf. In this way, the centralized document system 110 increases the transparency that a substitute receiving entity executed a document on behalf of a receiving entity in addition to the transparency at which the substitute receiving entity views electronic documents. The substitute receiving entity is thus assisted in distinguishing when documents are opened for signature by the substitute receiving entity (i.e., when not signing on behalf of another entity) and when documents are opened for signing on behalf of another entity.

Figure 7:
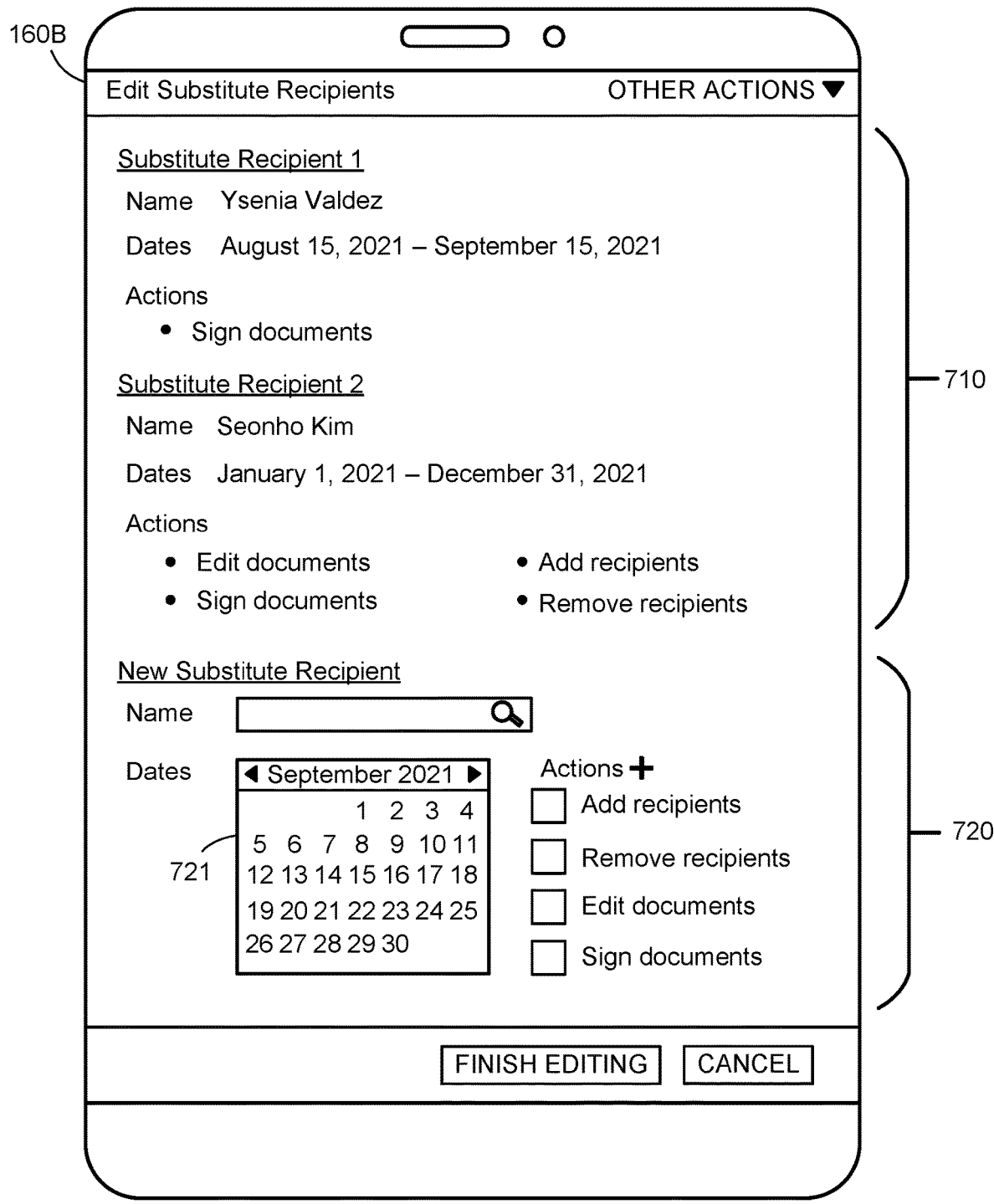
FIG. 7 illustrates an example user interface for editing substitute recipients of a document package, according to one embodiment.

FIG. 7 illustrates an example user interface 700 for editing substitute recipients of a document package, according to one embodiment. The user interface 700 may be viewed from the perspective of a receiving entity 150 on a user device 160B. The user interface 700 may be generated by the interface engine 250. The user interface 700 includes a summary field 710 and a creation field 720. In alternative configurations, different and/or additional user interface elements may be included in the user interface 700.

The summary field 710 includes one or more identifiers of substitute receiving entities that have already been assigned permissions to perform certain actions on document packages intended for the receiving entity 150. The receiving entity 150 may specify document permissions for a new substitute receiving entity using the creation field 720. The document permissions can include which actions that the substitute receiving entity has permission to perform and a time period during which the substitute receiving entity has permission to perform these actions. For example, the user interface 700 includes a calendar 721 that serves as a user input for the receiving entity to specify a start date and an end date of the time period. In this way, the centralized document system 110 provides increased granularity on the permissions that a substitute receiving entity has by specifying times during which the centralized document system 110 can distribute document packages to the substitute receiving entity and which actions the substitute receiving entity can perform on the received document packages.

Document Package Distribution Based on Document Sensitivity

Figure 8:
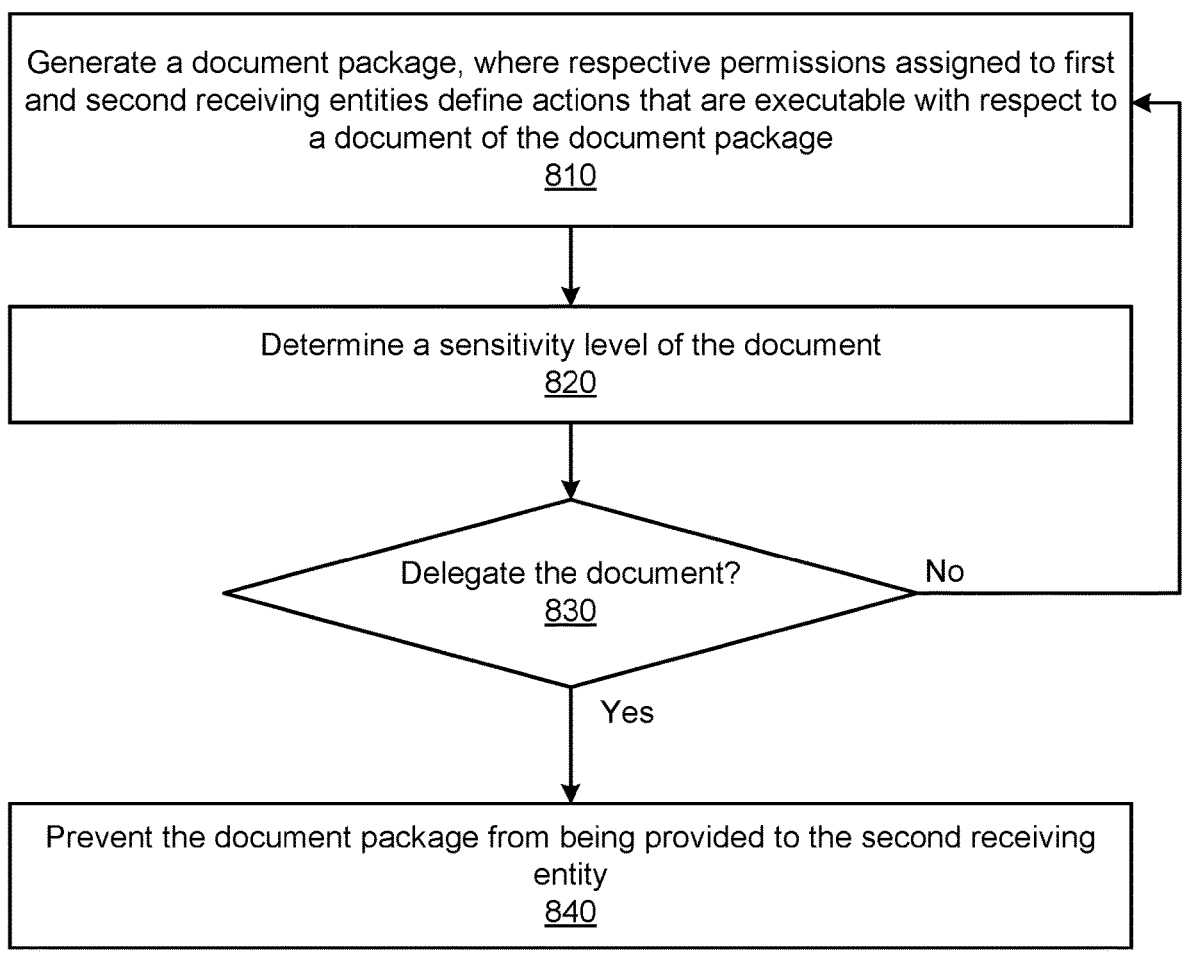
FIG. 8 is a flowchart of a process for managing the distribution of a document package based on a sensitivity of at least one document in the document package, according to one embodiment.

FIG. 8 is a flowchart of a process 800 for managing the distribution of a document package based on a sensitivity of at least one document in the document package, according to one embodiment. It should be noted that in other embodiments, the process 800 illustrated in FIG. 8 can include fewer, additional, or different steps that those described herein.

The centralized document system 110 generates 810 a document package. The document package may include a document with which receiving entities may perform actions (e.g., applying an electronic signature). A first set of document permissions can be assigned to a first receiving entity (e.g., the intended receiving entity asked to sign a document) and a second set of document permissions can be assigned to a second receiving entity (e.g., a substitute receiving entity that can sign on behalf of the first receiving entity). The first and second set of document permissions can define respective actions that are executable by the first and second receiving entities with a document of the document package. For example, the first set of document permissions can specify that the first receiving entity can assign new substitute receiving entities, edit text within a document (e.g., editing the language of a contract), and sign a document. The second set of document permissions can specify that the second receiving entity can sign a document on behalf of the first receiving entity. In some embodiments, the centralized document system 110 can generate 810 the document package in response to a request from an originating entity.

The centralized document system 110 determines 820 a sensitivity level of a document in the document package. The centralized document system 110 may use a model and document attributes of the document to determine the sensitivity level. In some embodiments, the model is a machine-learned model that receives, as input, the document attributes (e.g., a feature vector generated using the document attributes) and outputs a sensitivity level and optionally, a confidence score associated with the determined 820 sensitivity level. For example, the centralized document system 110 may generate a feature vector of document attributes of a property rental agreement. The document attributes may include the content of the agreement, as recognized through object recognition, including names, email addresses, residential addresses, and a cost of rent. The document attributes may also include the author of the agreement and the document type (e.g., rental agreement). The machine-learned model (e.g., the sensitivity model 270) may be applied to the generated feature vector to determine 820 that the sensitivity level of the rental agreement is a second sensitivity level. Additionally or alternatively, the feature vector may also be generated using entity attributes such as the respective IP addresses of the originating and receiving entities and the respective organizations of the originating and receiving entities.

The centralized document system 110 determines 830 whether to delegate the document to the second receiving entity for execution on behalf of the first receiving entity. The centralized document system 110 may determine 830 to override, based on the sensitivity level of the document and a policy of the originating entity's organization, a policy of the first and second receiving entity's organization that would otherwise permit the delegation. In some embodiments, the centralized document system 110 may access a mapping (e.g., pre-defined mapping) of sensitivity levels to document package distribution instructions. For example, a first mapping may map a second sensitivity level to an instruction to prevent a substitute receiving entity from receiving document packages associated with the second sensitivity level. A second mapping may map a first sensitivity level to an instruction to provide a document package associated with the first sensitivity level to both a substitute receiving entity and a primary receiving entity that delegated the substitute receiving entity. In some embodiments, the mapping may specify that, under a condition where a document package contains documents of different sensitivity levels, to apply the instruction associated with a particular sensitivity level of the different sensitivity levels (e.g., the most restrictive or secure sensitivity level that conservatively prevents substitute receiving entities from seeing sensitive information). The centralized document system 110 may thus determine not to delegate the document to a substitute receiving entity to execute a document on behalf of another receiving entity if the sensitivity level maps to an instruction, which may be set in a policy of the originating entity's organization, not to delegate the sensitive document. If the centralized document system 110 determines not to delegate, the centralized document system 110 may return to waiting for a subsequent request to generate 810 a document package for distribution to receiving entities.

The centralized document system 110 prevents 840 the document package from being provided to the second receiving entity. In some embodiments, the centralized document system sends the document package to the first receiving entity and not to the second receiving entity in response to determining that the second sensitivity level of the document package corresponding to an instruction in the originating entity's organization's policy prohibiting substitute receiving entities from receiving documents associated with the second sensitivity level.

In one non-limiting example of process 800, a vendor (i.e., an originating entity) wants to send a contract to an organization's supply chain manager (i.e., a receiving entity). The vendor requests that the centralized document system generate 810 an envelope with the contract and technical documents related to the services to be provided according to the contract. However, the supply chain manager is out of town for the next week on vacation. The supply chain manager has requested from the originating entity that substitute receiving entities can sign on their behalf. In particular, the supply chain manager assigned a fellow supply chain manager in their organization permissions to execute documents on their behalf. However, the vendor has included sensitive information in the contract that should not be viewed by the other supply chain manager (e.g., there is content in the technical documents for a client that the other supply chain manager is prevented from working for due to an ethical wall set by their organization). The centralized document system may determine document attributes of the envelope (e.g., object recognition indicating title of the technical documents is "Technical Reference Manual," which is a document attribute historically associated with a high level of sensitivity), and/or entity attributes of the receiving entities (e.g., the other supply chain manager's job title and document envelopes that have been previously been sent to them). Before sending the envelope to the supply chain manager, and thereby also sending the envelope to the other supply chain manager, the centralized document system may determine 820, by applying a machine-learned model to the document and entity attributes, the sensitivity level of the vendor's envelope is likely to be a particular level that the vendor's organization's policies have deemed as prohibited from being provided to substitute receiving entities. Thus, despite the supply chain manager's organization having a policy that may allow the other supply chain manager to execute documents on behalf of the primary supply chain manager, the centralized document system may determine 830 not to delegate the document package and prevent 840 the other supply chain manager from receiving the document package.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    based on a request associated with an originating entity, generating, by a centralized document system, a document package, wherein a first set of document permissions is assigned to a first receiving entity and a second set of document permissions is assigned to a second receiving entity, the first set and second set of document permissions defining respective actions that are executable by the first and second receiving entities with a document of the document package; and
    based on a determination that the first receiving entity is unavailable and a determination that a policy of the first receiving entity specifies that the second receiving entity is authorized to receive the document package:
    determining, by the centralized document system, a sensitivity level of the document using a model and a plurality of document attributes of the document, wherein the plurality of document attributes comprises content within the document;

determining, by the centralized document system, that the sensitivity level satisfies a first threshold from a policy of the originating entity and does not satisfy a second threshold from the policy of the originating entity; and based on the determining that the sensitivity level satisfies the first threshold and does not satisfy the second threshold:

removing, by the centralized document system, sensitive content within the document to generate a modified document; and providing, by the centralized document system, the modified document to a user device associated with the second receiving entity.

2. The method of claim 1, further comprising:

determining, by the centralized document system, that the first receiving entity is unavailable based on one or more of a presence of an automated reply to electronic communication received by the first receiving entity, an indication of time sensitivity associated with the document, or a current date falling within an out-of-office schedule.

3. The method of claim 1, wherein the document package is a first document package and the document is a first document, the method further comprising:

generating, by the centralized document system, a second document package comprising a second document; and based on the determination that the first receiving entity is unavailable, a determination that the policy of the first receiving entity specifies that the second receiving entity is authorized to receive the second document package, and a determination that a sensitivity level of the second document satisfies the first threshold and satisfies the second threshold, causing, by the centralized document system, the user device associated with the second receiving entity to render a graphical user interface (GUI) comprising a notification within the second document, the notification notifying the second receiving entity of a permission of the second set of document permissions enabling the second receiving entity to execute the second document on behalf of the first receiving entity.

4. The method of claim 1, wherein the model is a machine-learned model trained using labeled representations of historical documents characterized by respective document attributes, wherein a plurality of labels associated with the labeled representations of historical documents indicates respective sensitivity levels.

5. The method of claim 4, wherein determining the sensitivity level of the document using the machine-learned model and the plurality of document attributes comprises:

generating a document feature representation using the plurality of document attributes;

applying the machine-learned model to the document feature representation, wherein the machine-learned model is configured to output a confidence score associated with the sensitivity level of the document; and in response to determining that the confidence score exceeds a threshold score, determining that the document has the sensitivity level.

6. The method of claim 4, wherein the machine learning model is trained by:

generating a plurality of document feature representations for each historical document of the historical documents, the document feature representations comprising numerical representations of the respective document attributes;

labeling the plurality of document feature representations using the plurality of labels;

creating a first set of training data using the labeled plurality of document feature representations; and training the machine-learned model using the first set of training data.

7. The method of claim 6, wherein the machine-learned model is further trained by:

receiving user feedback indicating a measure of approval of the sensitivity level of the document;

creating a second set of training data based on the user feedback; and re-training the machine-learned model using the second set of training data.

8. The method of claim 1, wherein the model is a rules-based model configured according to a plurality of rules that specify the document has one of a plurality of sensitivity levels based on the plurality of document attributes, wherein a first sensitivity level indicates that the document is not sensitive.

9. The method of claim 8, wherein a rule of the rules-based model specifies that the document has a second level of sensitivity in response to determining that an author of the document has a title of authority associated with high sensitivity documents.

10. The method of claim 1, further comprising causing, by the centralized document system, a user device associated with the first receiving entity to render a graphical user interface (GUI) comprising identifiers of a plurality of document packages received for execution by the first receiving entity and a plurality of user inputs for filtering the plurality of document packages that were also provided to the second receiving entity for execution on behalf of the first receiving entity.

11. The method of claim 1, wherein a permission of the second set of document permissions is specified to limit the respective actions that can be performed by the second receiving entity from a start date to an end date, the method further comprising causing a user device associated with the first receiving entity to render a graphical user interface (GUI) comprising a plurality of user inputs for specifying the start date and the end date.

12. The method of claim 1, wherein the document package is a first document package and the document is a first document, the method further comprising:

generating, by the centralized document system, a second document package comprising a second document; and based on the determination that the first receiving entity is unavailable, a determination that the policy of the first receiving entity specifies that the second receiving entity is authorized to receive the second document package, and a determination that a sensitivity level of the second document satisfies the first threshold and satisfies the second threshold, providing, by the document system, the second document to the user device associated with the second receiving entity for execution on behalf of the first receiving entity.

13. The method of claim 1, wherein determining the sensitivity level further uses a plurality of entity attributes of the second receiving entity, wherein the plurality of entity attributes includes one or more of a title in an organization, an Internet Protocol (IP) address, historical document packages executed by the second receiving entity, a name of the organization, an org chart of the organization, or a policy of the organization.

14. The method of claim 1, wherein the plurality of document attributes includes at least one of an author of the document, a document type, or a date at which the document was generated.

15. Non-transitory computer-readable storage media storing executable instructions that, when executed, cause one or more processors to:
- based on a request associated with an originating entity, generate a document package, wherein a first set of document permissions is assigned to a first receiving entity and a second set of document permissions is assigned to a second receiving entity, the first set and second set of document permissions defining respective actions that are executable by the first and second receiving entities with a document of the document package; and
- based on a determination that the first receiving entity is unavailable and a determination that a policy of the first receiving entity specifies that the second receiving entity is authorized to receive the document package:
- determine a sensitivity level of the document using a model and a plurality of document attributes of the document, wherein the plurality of document attributes comprises content within the document; and
- based on a determination that the sensitivity level satisfies a first threshold from a policy of the originating entity and does not satisfy a second threshold from the policy of the originating entity:
- remove sensitive content within the document to generate a modified document; and
- provide the modified document to a user device associated with the second receiving entity.

16. A centralized document system comprising one or more processors and non-transitory computer-readable storage media storing instructions that, when executed, cause the one or more processors to:
- based on a request associated with an originating entity, generate a document package, wherein a first set of document permissions is assigned to a first receiving entity and a second set of document permissions is assigned to a second receiving entity, the first set and second set of document permissions defining respective actions that are executable by the first and second receiving entities with a document of the document package; and
- based on a determination that the first receiving entity is unavailable and a determination that a policy of the first receiving entity specifies that the second receiving entity is authorized to receive the document package:
- determine a sensitivity level of the document using a model and a plurality of document attributes of the document, wherein the plurality of document attributes comprises content within the document; and
- based on a determination that the sensitivity level satisfies a first threshold from a policy of the originating entity and does not satisfy a second threshold from the policy of the originating entity:
- remove sensitive content within the document to generate a modified document; and
- provide the modified document to a user device associated with the second receiving entity.

\* \* \* \* \*